US006296098B1

(12) United States Patent
Graton et al.

(10) Patent No.: US 6,296,098 B1
(45) Date of Patent: *Oct. 2, 2001

(54) FRICTION CLUTCH MECHANISM, IN PARTICULAR FOR MOTOR VEHICLE, COMPRISING A WEAR TAKE-UP DEVICE

(75) Inventors: Michel Graton, Paris; Michel Blard, Issy-les-Moulineaux; André Dalbiez, Argenteuil, all of (FR)

(73) Assignee: Valeo, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/402,396

(22) PCT Filed: Feb. 5, 1999

(86) PCT No.: PCT/FR99/00261

§ 371 Date: Feb. 24, 2000

§ 102(e) Date: Feb. 24, 2000

(87) PCT Pub. No.: WO99/40335

PCT Pub. Date: Aug. 12, 1999

(30) Foreign Application Priority Data

Feb. 5, 1998 (FR) .................................. 98 01453
Dec. 2, 1998 (FR) .................................. 98 15261

(51) Int. Cl.[7] .................................................. F16D 13/75
(52) U.S. Cl. .................................. 192/70.25; 192/111 A
(58) Field of Search ............................. 192/70.25, 111 A; 74/425

(56) References Cited

U.S. PATENT DOCUMENTS

| 4,228,883 | * | 10/1980 | Palmer | 192/111 A |
| 5,090,536 | | 2/1992 | Asada | 192/70.25 |
| 5,816,379 | * | 10/1998 | De Briel et al. | 192/70.25 |
| 5,937,986 | * | 8/1999 | Schubert | 192/70.25 |
| 5,971,125 | * | 10/1999 | Doremus et al. | 192/70.25 |

FOREIGN PATENT DOCUMENTS

| 2345620 | 10/1977 | (FR) . |
| 2753503 | 3/1998 | (FR) . |

OTHER PUBLICATIONS

Patent Abstracts of Japan, vol. 097, No. 005, Nippon Seiko KK, reduction Gear Mechanism for Motor–Driven Power Steering, Appl. No. 07178888, Appl. Date Jul. 14, 1995.

* cited by examiner

Primary Examiner—Richard M. Lorence
(74) Attorney, Agent, or Firm—Liniak, Berenato, Longacre & White

(57) ABSTRACT

The invention concerns a wear take-up mechanism comprising a housing (10) borne by the cover (52) and ramp means (54) set between the means (14) supporting the clutch shifting means and a pressure plate (51). The cassette has two side wings (65, 66) each provided with a hole (61), said holes (61) being axially offset mutually for mounting a rotating endless screw (63) capable of driving in rotation the ramp means (54) and extended by a pin (67). The invention is applicable to motor vehicles.

21 Claims, 18 Drawing Sheets

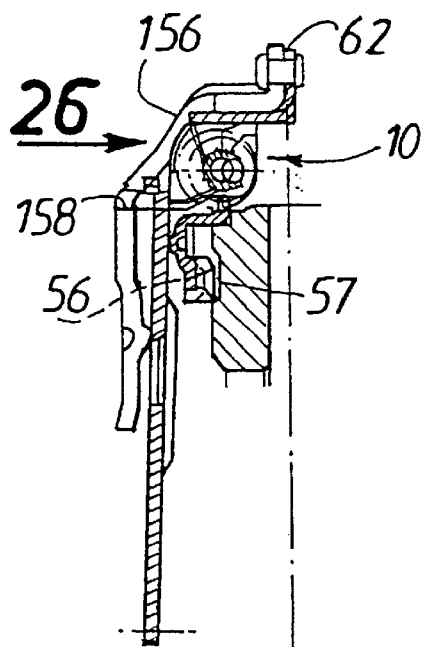
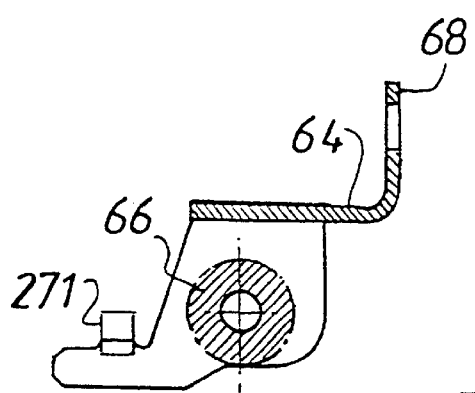
FIG.25
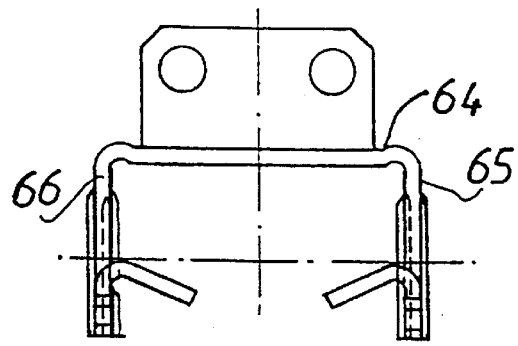
FIG.26
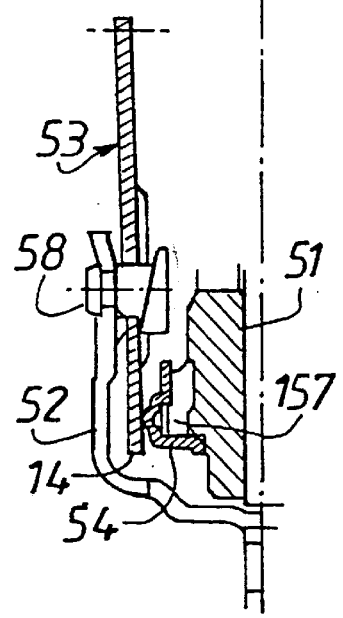
FIG.23
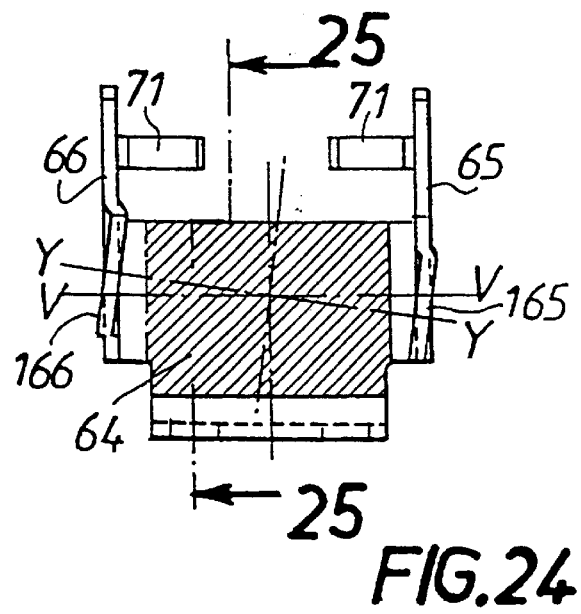
FIG.24

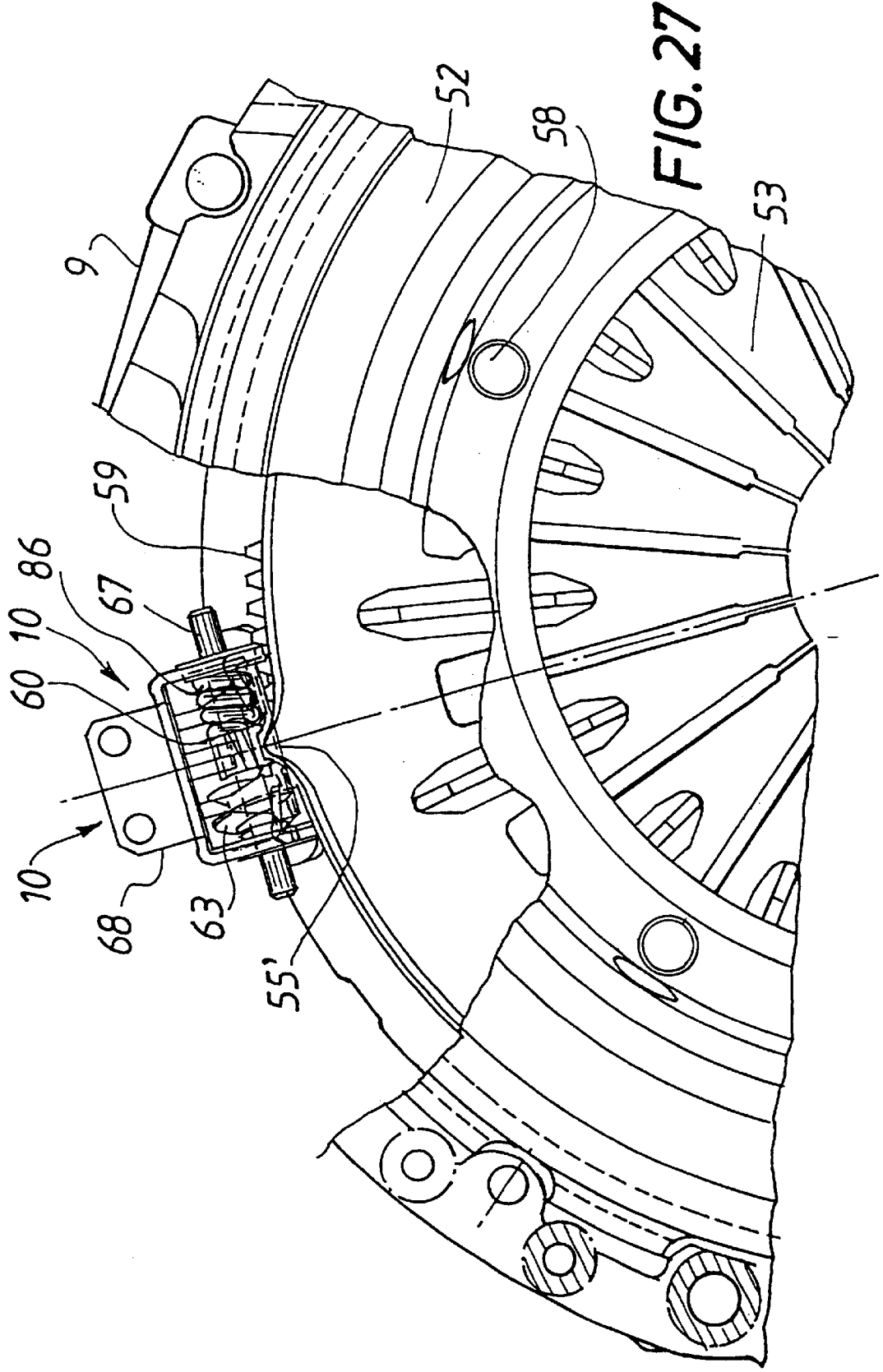

FRICTION CLUTCH MECHANISM, IN PARTICULAR FOR MOTOR VEHICLE, COMPRISING A WEAR TAKE-UP DEVICE

BACKGROUND OF THE INVENTION

1. Field of the Invention

The present invention concerns a friction clutch, notably for a motor vehicle, and relates more particularly to a clutch equipped with a device for compensating for the wear due notably to the wear on at least one friction lining, the said device, referred to hereinafter as a wear take-up device, operating gradually as the wear occurs on the said lining or linings.

It relates to the friction clutch mechanisms which such a clutch has.

2. Description of the Related Art

A conventional friction clutch generally has a reaction plate forming part of an engine flywheel, possibly in two parts in order to form a damping flywheel or a flexible flywheel, fixed with respect to rotation to a first shaft, usually a driving shaft such as the crankshaft of the internal combustion engine, and supporting, through its external periphery, a cover to which at least one pressure plate is attached with axial mobility.

The pressure plate is fixed with respect to rotation to the cover and the reaction plate whilst being able to move axially under the action of axially acting engagement means controlled by disengagement means. The disengagement means can consist of helical springs, or two Belleville washers mounted in series, subject to the action of disengagement levers forming the disengaging means.

Generally, the engaging and disengaging means form part of the same piece, for example a metallic diaphragm bearing on the cover; the diaphragm can be mounted in series or in parallel with a Belleville washer in order to provide assistance for the disengagement force.

A friction disc, carrying friction linings at its external periphery, fixed with respect to rotation to a shaft, usually a driven shaft such as the gearbox input shaft, is interposed between the pressure plate and the reaction plate so as to be gripped between them when the clutch is in the engagement position in order to transmit the torque from the driving shaft to the driven shaft.

Conventionally, the friction linings are mounted on an axially elastic support coupled rigidly or elastically to a hub fixed with respect to rotation to the driven shaft. By virtue of this arrangement the friction disc assists the diaphragm during the operation of disengaging the clutch. As a variant, the support is rigid whilst for example being embedded at its external periphery in a single friction lining.

Conventionally, the engaging means, the cover and the pressure plate form part of a unitary assembly referred to as a friction clutch mechanism.

The engaging means control the axial movement of the pressure plate when they are actuated by a clutch release bearing by means of disengaging means.

The clutch release bearing can be controlled mechanically, hydraulically or electrically. The control can be of the manual, automatic or semi-automatic type.

During the service life of such a clutch, the friction lining or linings, as well as the counter-materials, pressure plate and reaction plate, wear, which causes a variation in the position of the pressure plate and that of the axially acting engaging means and of the clutch release bearing, resulting in a variation in the clamping force between the friction disc on the one hand and the pressure and reaction plates on the other hand, because of the changes in the working conditions of the engaging means, and the force necessary for disengaging is affected thereby. By providing such a clutch with a wear take-up device, these drawbacks are avoided, the engaging means, and the clutch release bearing, usually in continuous abutment on the disengaging means, occupying the same position when the clutch is in the engagement position so that the axial dimension of the clutch is reduced.

In the document FR 96 11297 filed on Sep. 17, 1996 and published under the number 2 753 503, the wear take-up device has, in FIGS. 21 to 26, a unit comprising, in a unitary fashion, a U-shaped support with a web and two lateral wings each provided with a hole for supporting at least one shaft carrying a worm, a ratchet wheel and a helical spring. The support also carries an elastic member provided, on the one hand, with a control tongue and on the other hand with a non-return catch.

The control tongue is able to be maneuvered by an actuator forming part of the engaging means of the clutch and cooperates, as well as the catch, with the teeth on the ratchet wheel.

The worm cooperates with the teeth of a set of teeth fixed with respect to rotation to the ramp means placed between the abutment means of the engaging means and the pressure plate. The worm cooperates with the set of teeth and with means of driving in rotation, comprising the helical spring forming a take-up spring, which are made operational by the wear on the friction linings when the clutch is engaged. The worm is mounted tangentially with respect to its associated set of teeth.

It is desirable to improve the cooperation of the worm with the set of teeth.

The object of the present invention is to meet this requirement simply and economically.

According to the invention a clutch mechanism of the type indicated above is characterised in that the holes in the wings are offset axially with respect to each other.

SUMMARY OF THE INVENTION

Thus it is possible to incline the shaft and therefore the worm.

Preferably the shaft is inclined at an angle equal to that of the worm thread. The inclination depends on the angle of the worm.

More precisely, the profile of the worm, notably the thread thereof, moves roughly parallel to the flanks of the teeth of the set of teeth. The face of the thread is therefore roughly parallel to the opposite flank of the tooth.

By virtue of the invention, the risks of jamming between the worm and the set of teeth fixed with respect to rotation to the ramp means are eliminated.

In addition, a good contact area is obtained between the worm and the set of teeth, whose teeth are thus straight.

The efficiency of the wear take-up device is high.

Certainly, it would have been possible to directly incline the unit but this would have increased the bulk thereof and therefore increased the size of the housing produced in the cover for mounting the unit.

By virtue of the invention the size of the unit remains roughly the same. In addition the support is not greatly modified.

The solution is therefore simple and economical.

In a first embodiment the wings are twisted so as to have inclined areas perpendicular to the shaft.

The twisting is simple to effect and is economical. In addition the number of parts is not increased.

In another embodiment the wings are not twisted so that the support is not modified.

The inclination is effected by means of bearings whose central hole is inclined. The bearings are mounted in the holes in the wings.

The holes are advantageously blind at the start and then subsequently closed off partially by crimping tongues in contact with the bearings for automatic mounting and/or formation of a single piece, shaft—worm—ratchet wheel. As a variant, the holes are closed by supplementary pieces fixed to the wings of the support, or by bonding or welding of the bearings to the edges of the blind holes.

According to the required inclination of the worm, the teeth of the ratchet wheel cooperating with one end of the control tongue and a non-return catch which the elastic member has are also inclined.

By virtue of this arrangement the free end of the control tongue extends parallel to the teeth of the ratchet wheel and the non-return catch is twisted, because of its offset with respect to the control tongue, so that its free end is parallel to the teeth.

Thus, in spite of the inclination of the shaft, there is a good transmission of forces between the engaging means and the ratchet wheel, and the non-return catch has a large area of contact with the teeth of the ratchet wheel.

By virtue of the invention, in spite of the inclination of the shaft, parallel faces are worked with, the thread of the worm being roughly parallel to the flanks of the teeth of the set of teeth, whilst the free ends of the catch and of the control tongue are parallel to the teeth of the ratchet wheel. The holes in the wings are not necessarily the same size.

For example, the shaft can have a portion with a reduced diameter passing through a hole of reduced size formed in one of the wings and immobilised axially by means of an elastic washer.

A cylindrical extension of the worm passes then through the other larger hole in the other wing.

The elastic member has a return carrying the control tongue at its centre.

According to one characteristic the return has on each side of the tongue first and second portions with different heights.

This return has a non-symmetrical shape, the first portion being opposite the screw and at a height less than that of the second portion located opposite the helical spring.

The return is thus mechanically strong.

This strength is increased by the fact that the control tongue is provided with an oblong-shaped reinforcing dished part. The dished part is also in the line of transmission of forces between the engaging means of the ratchet wheel, which is favourable to the driving of the ratchet wheel.

This wheel has teeth inclined according to the thread of the worm.

The control tongue and non-return catch, whose free ends are inclined, operate under very good conditions.

Thus, in the event of wear on the linings, it is possible to cock the helical spring adequately and then, subsequently, this spring, during the disengagement operation, can suitably drive the ramp means.

Naturally, the support can be in a single piece with the cover and be produced by means of a U-shaped deformation produced at the external periphery of the cover in order to form a housing for the elastic member and the worm mounted on its shaft.

As a variant, the support consists of the elastic member.

Naturally, the unit may have no take-up spring. This spring can be located between the ramps and counter-ramps of the wear take-up device, as described in the document FR-A-2 606 477.

The ramp means can be in a single piece with the set of teeth. As a variant, the set of teeth belong to an intermediate piece connected with respect to rotation to the ramps able to move axially with respect to the intermediate piece overall, axially fixed with respect to the cover.

For example, the intermediate piece is gripped between extensions issuing from a set of first tongues rotatably connecting the pressure plate to the cover.

As a variant, the intermediate piece is connected to the ramps by second tongues, of the same type as the first tongues, allowing axial movement of the ramps with respect to the intermediate piece. For more information reference should be made to the document FR-98 11991 filed on Sep. 23, 1998. As a result the elastic member may have no non-return catch.

The wear take-up device has, by virtue of all these provisions, high efficiency and a long service life.

In order to give a better understanding of the object of the invention, a description will now be given, by way of purely illustrative and non-limitative example, an embodiment depicted in the accompanying drawings, in which:

BRIEF DESCRIPTION OF THE DRAWINGS

FIG. 17 is a view in perspective of the ramp means of the wear take-up device;

FIG. 23 is a view similar to FIG. 2 for a fourth example embodiment;

FIG. 24 is a view similar to FIG. 13 for this fourth example embodiment;

FIG. 25 is a view in section along the line 25—25 in FIG. 24;

FIG. 26 is a view of the support in the direction of the arrow 26 in FIG. 23;

FIG. 27 is a partial view with local cutaway in the direction of the arrow 26 in FIG. 23;

In the figures, the common elements will be allocated the same reference signs.

DETAILED DESCRIPTION OF THE PREFERRED EMBODIMENTS

The figures depict a clutch equipped with a wear take-up device, of the type described in the French patent application filed on Sep. 17, 1996 under the number 96 11297 (FR-A-2 753 503), to which reference should be made for more details.

Figure 1:
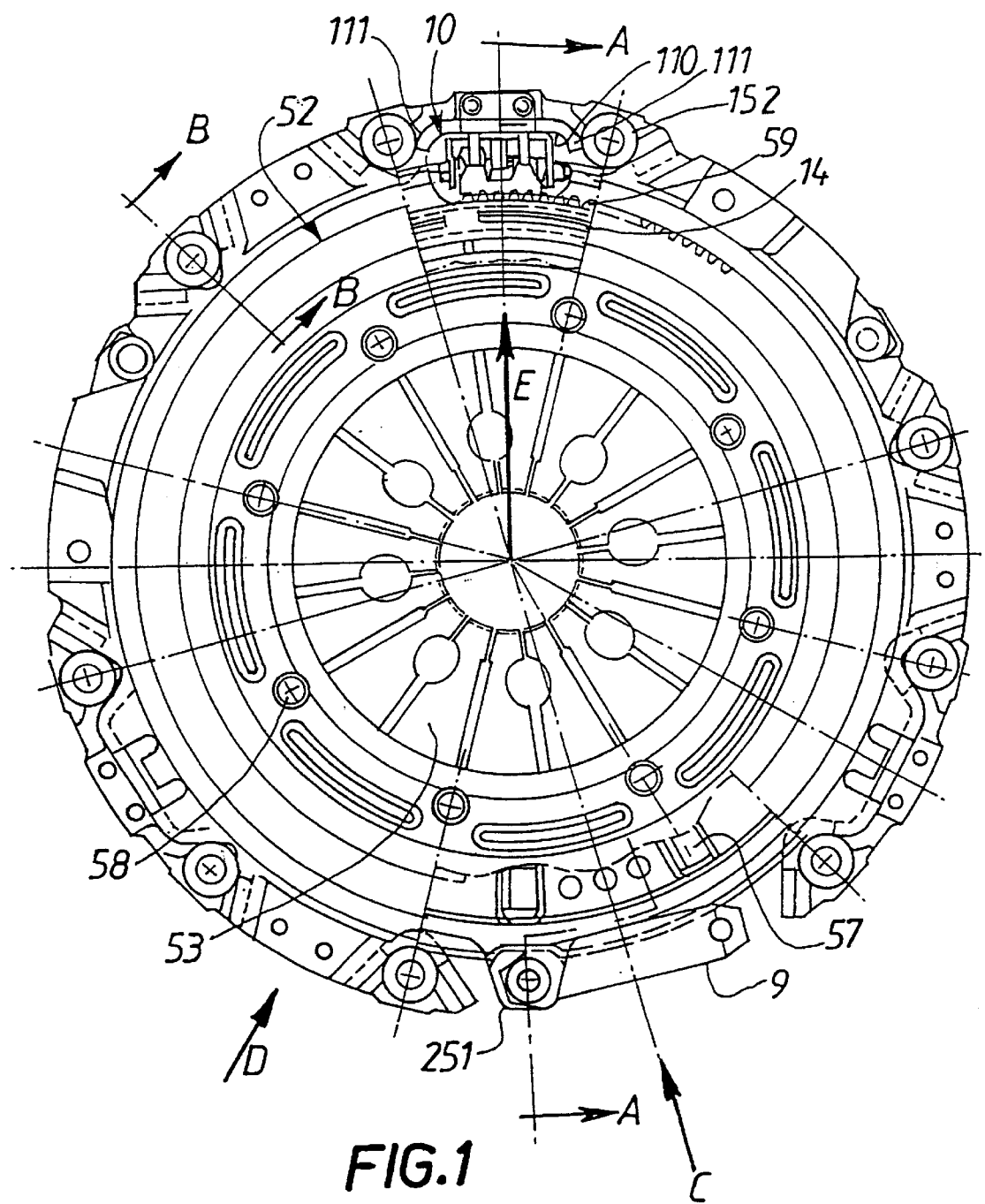
FIG. 1 is a front view of a clutch equipped with a wear take-up device according to the invention, with local cut-aways to show the set of teeth of the ramp means and the tangential tongues.

Referring to the figures, a friction clutch mechanism can be seen, notably for a motor vehicle, with an axial axis of symmetry X—X, which forms a unitary assembly and which comprises a pressure plate 51 intended to cooperate with a friction disc (depicted schematically in FIG. 7 at 100), carrying friction linings at its external periphery, which itself cooperates with a reaction plate. The reaction plate, depicted schematically at 101 in FIG. 1, is intended to be fixed with respect to rotation to a driving shaft, such as the crankshaft of the internal combustion engine. The friction disc is fixed with respect to rotation to a driven shaft, such as the gearbox input shaft.

Figure 4:
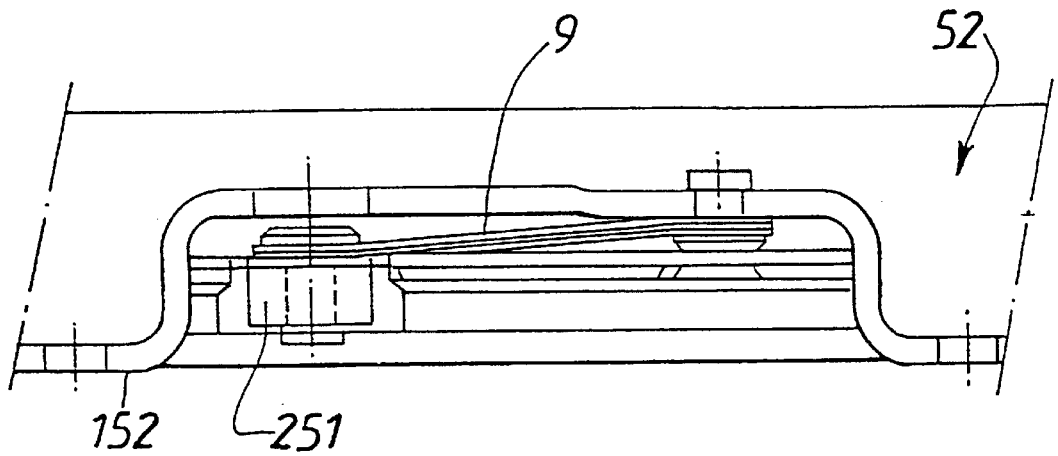
FIGS. 4, 5, 6 are views to a larger scale in the direction respectively of the arrows C, D, E in FIG. 1.

The pressure plate 51 is fixed with respect to rotation to the cover 52 by means of tangential tongues 9, one of which is visible in FIG. 4 and which, axially elastic, constitutes at the same time means of returning the pressure plate 51 towards the cover 52.

The tongues 59 are fixed by riveting at one of their ends to the cover and at their other end to a lug 251 on the pressure plate (reference FIG. 4).

The tongues 9 allow an axial movement of the pressure plate 51 with respect to the cover 52. The cover is metallic, being made of pressed sheet metal. This cover 52 has a base, transversely oriented, with a hole in the centre and means 152 for fixing it to a reaction plate, possibly divided in order to form a damping flywheel.

Here the cover 52 is roughly in the form of a hollow dish and has at its external periphery a radial flange 152 forming the means of fixing the cover to the reaction plate, the said flange being provided with holes for members such as screws to pass for fixing the cover to the reaction plate.

An axially oriented annular skirt connects the base to the flange and is open at the level of the tongues 9 (FIG. 4).

Here the reaction plate 101 is flat. As a variant this plate has a skirt to which the flange 152 is fixed so that the cover 52 can be less deep.

The pressure plate 51, whilst being fixed with respect to rotation to the cover 52, can therefore be moved axially with respect to the cover 52 under the action of axially acting engaging means controlled by disengaging means, here a diaphragm 53 mounted articulated on the cover 52 by virtue of small columns 58 carried by the base of the cover 52 with a central hole.

The diaphragm 53, forming an axially acting elastic means, has a frustoconical shape in the free state and has a peripheral part in the form of a Belleville washer extended towards the centre by a central part divided into radial fingers by slots, as can be seen in FIG. 1.

The diaphragm 53 bears, by means of its Belleville washer, on the base of the cover for action on the pressure plate 51 and clamping of the friction linings on the friction disc between the pressure and reaction plates.

Here the clutch is of the pushed type, that is to say it is necessary, by means of a clutch release bearing, controlled manually, semi-automatically or automatically and not depicted, to act by pushing on the internal end of the fingers of the diaphragm 53 in order to disengage (declutch) the clutch. To do this (FIG. 2), the base of the cover 52 carries on the one hand a primary support consisting for example of a retaining ring, or here a dished part produced in the base of the cover at the internal periphery thereof and, on the other hand, opposite the primary abutment, a secondary abutment in the form of a rolled annulus carried by the small columns 58, or any other means. The diaphragm 53, through the internal periphery of its Belleville washer, is mounted so as to tilt or pivot between the said primary and second abutments. Through the external periphery of its Belleville washer, it is in contact with abutment areas 14, described below. These areas 14, forming abutment means, are carried by the pressure plate.

In order, when the clutch is engaged, to keep the axially acting engaging means 53 in a position independent of the wear on the linings of the friction disc, and to a lesser extend the wear on the pressure 51 and reaction plates whose faces, referred to as friction faces, wear in contact with the disc linings, a wear take-up device 10 is provided.

Figure 2:
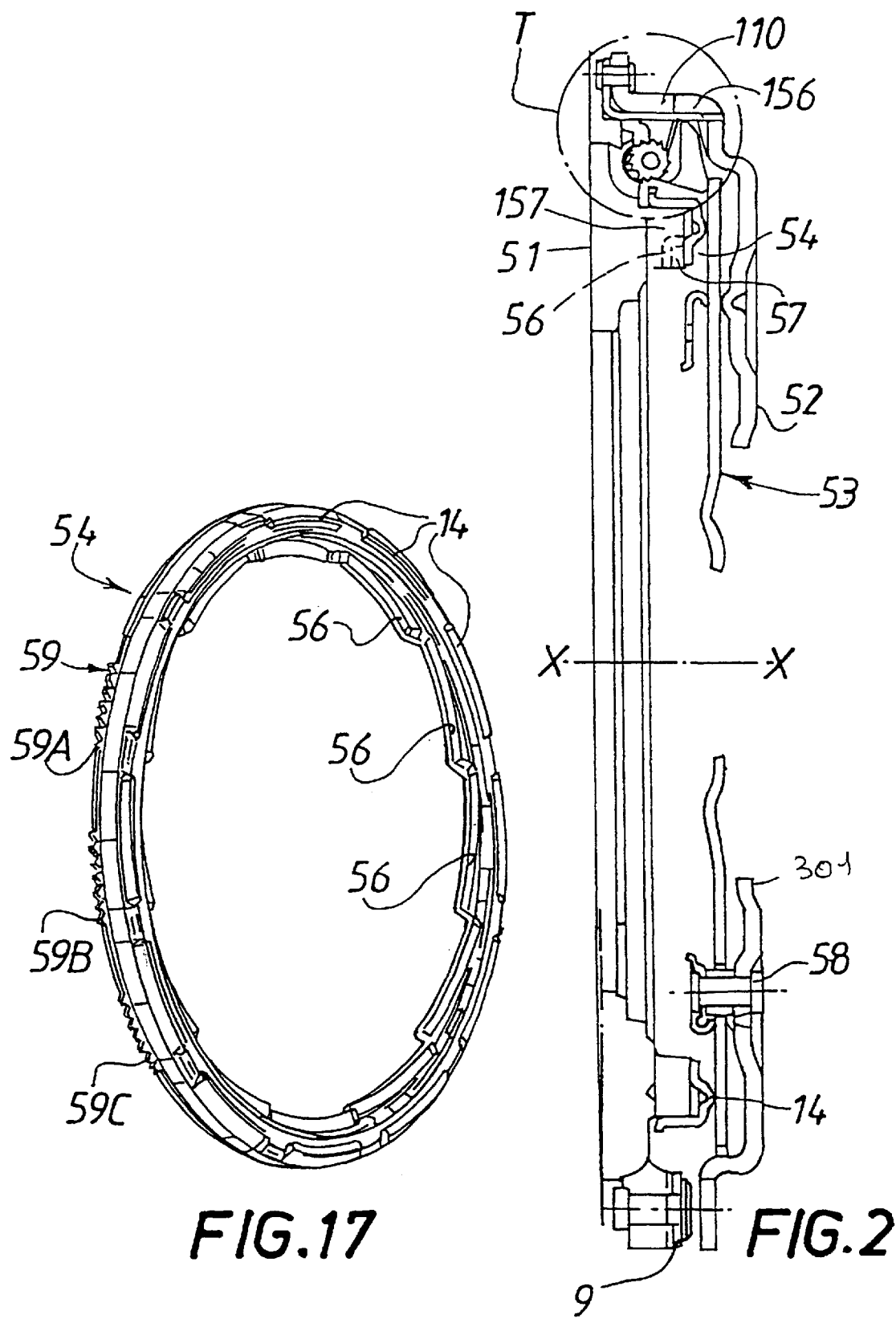
FIG. 2 is a view in section along the line A—A in FIG. 1.
Figure 3:
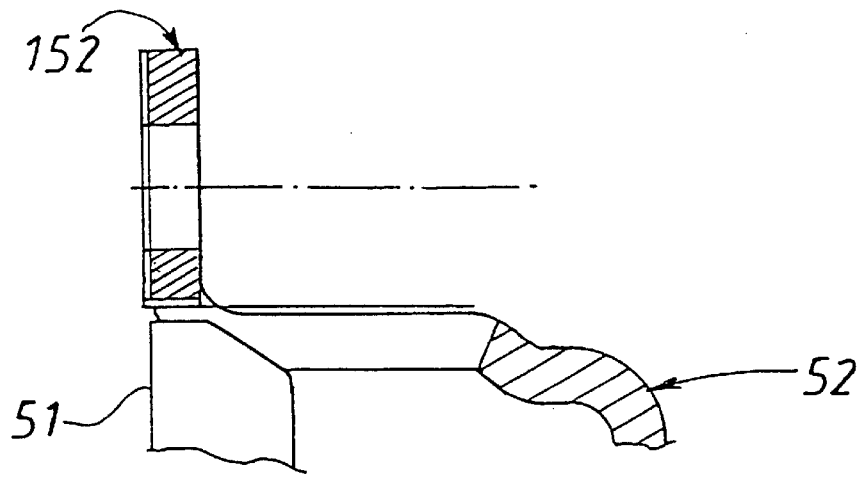
FIG. 3 is a view in section along the line B—B in FIG. 1.

The wear take-up device comprises a unit 10 and ramp means 54 disposed circumferentially; more precisely, these ramp means 54 consist of a ring made of cropped and pressed sheet metal so as to have ramps 56 disposed circumferentially; the said ring also has abutment areas 14 consisting of the rounded top edge of dished parts in the form of arcs of a circle centred on the axis of the clutch and placed radially towards the outside with respect to the ramps 56 (FIGS. 2 and 17).

The pressure plate 51 has here, made by moulding, on its face turned towards the base of the cover 52, radially beyond the small columns 58, studs 57 distributed circumferentially at a distance from each other which corresponds to that which circumferentially separates two successive ramps 56, the studs 57 being intended to cooperate each with a ramp 56.

Figure 5:
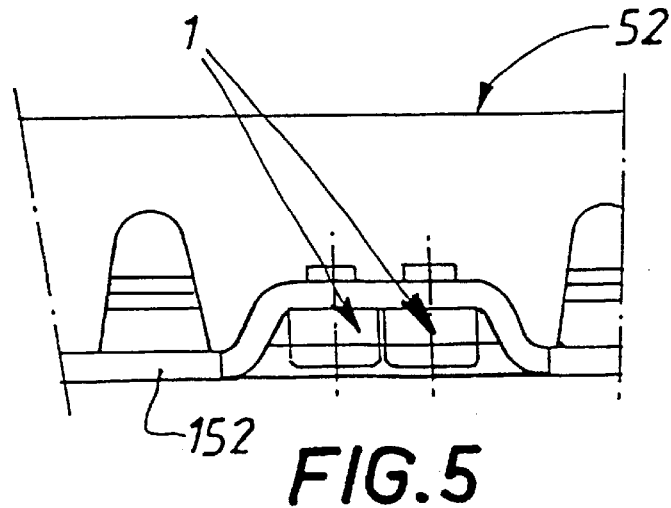
Figure 6:
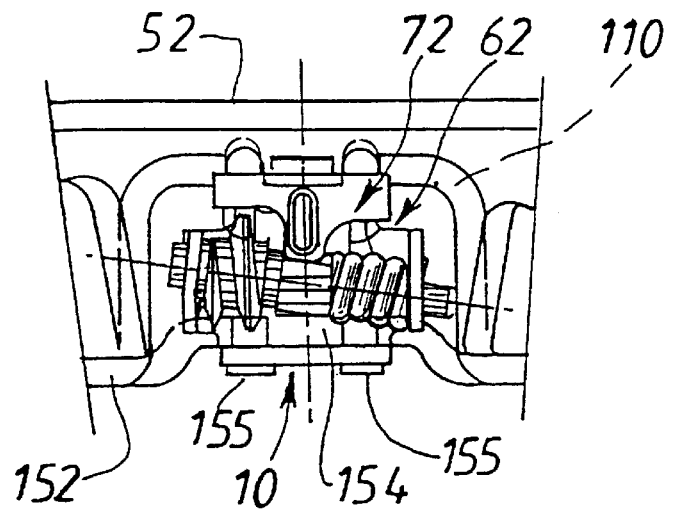

The flange 152 has areas offset axially in the direction of the base of the cover in order to carry balancing rivets 1 (FIG. 5) in order to balance the clutch mechanism including in a unitary fashion the cover 52, the pressure plate 51, the diaphragm 53 and the wear take-up device.

The ramp means 54 are placed axially between the diaphragm 53 and the pressure plate 51 so that the studs 57 receive the ramps 56 and the diaphragm 53 cooperates with the abutment areas 14 which thus constitute the abutment means, here divided in a continuous variant, by means of which the diaphragm 53 acts on the pressure plate 51. This arrangement is economical and simple, the ramp means 54 being metallic and obtained by pressing. As a variant the studs 57 are replaced by counter-ramps with the same shape as the ramps 54.

At least one of the abutment areas 14 of the ramp means 54 is extended at its external periphery by a flange parallel to the axis of the clutch, ending in a transverse return, that is to say lying in a plane perpendicular to the axis X—X of the clutch, provided at its external periphery with a set of teeth 59, so that the abutment areas 14 can be continuous and so that the flange is centred by means of a thicker part 157 on the pressure plate 51.

It is in each thicker part 157 that the studs 57 are formed. All the thicker parts 157 can participate in the centring of the ring 54 having a continuous flange. As a variant, all the thicker parts 157 do not participate a centring. Likewise the flange of the ring 54 may not be continuous. This ring 54 therefore has a lesser number of centring areas than there are studs 57, each centring area being associated with a ramp 56.

Advantageously the studs 57 and therefore the thicker parts 157 are bevelled in order to cooperate in a complementary fashion with the ramps 56. In all cases the studs 57 form counter-ramps.

The number of studs 57 and ramps 56 depends on the application, and the same applies to the complementary centring areas formed respectively at the external periphery of the studs 57 and at the internal periphery of the axial flange or flanges of the ring 54.

Thus twelve ramps 56 and studs 57 can be provided. Twelve thicker parts 157 can form the centring area in association with twelve centring areas belonging to the ring.

As a variant, six thicker parts 157 can form the centring area, the ring 54 having six centring areas and viceversa. The pressure plate 51 therefore carries the abutment areas 14 and the ramp means 54 able to move in rotation, whilst the pressure plate is fixed with respect to rotation. This plate 51 thus has a variable thickness. More precisely, the distance between its front face, serving as a friction face for the friction disc 100, and the abutment areas 14, varies according to the aforementioned wear.

Naturally it is possible to produce the ramps and counter-ramps by means of the nut and screw system. For example, a ring carrying the abutment areas 14 has an internal thread in order to screw onto an external thread on the pressure plate.

The wear take-up device also comprises a ratchet wheel 60 with inclined teeth secured to a shaft 67 which also carries a worm 63; the thread and pitch of the worm 63 are adapted to the set of teeth 59; the worm 63 is caused to cooperate with the set of teeth 59 in a manner which will be described below. The worm 63 extends tangentially with respect to the set of teeth.

Figure 7:
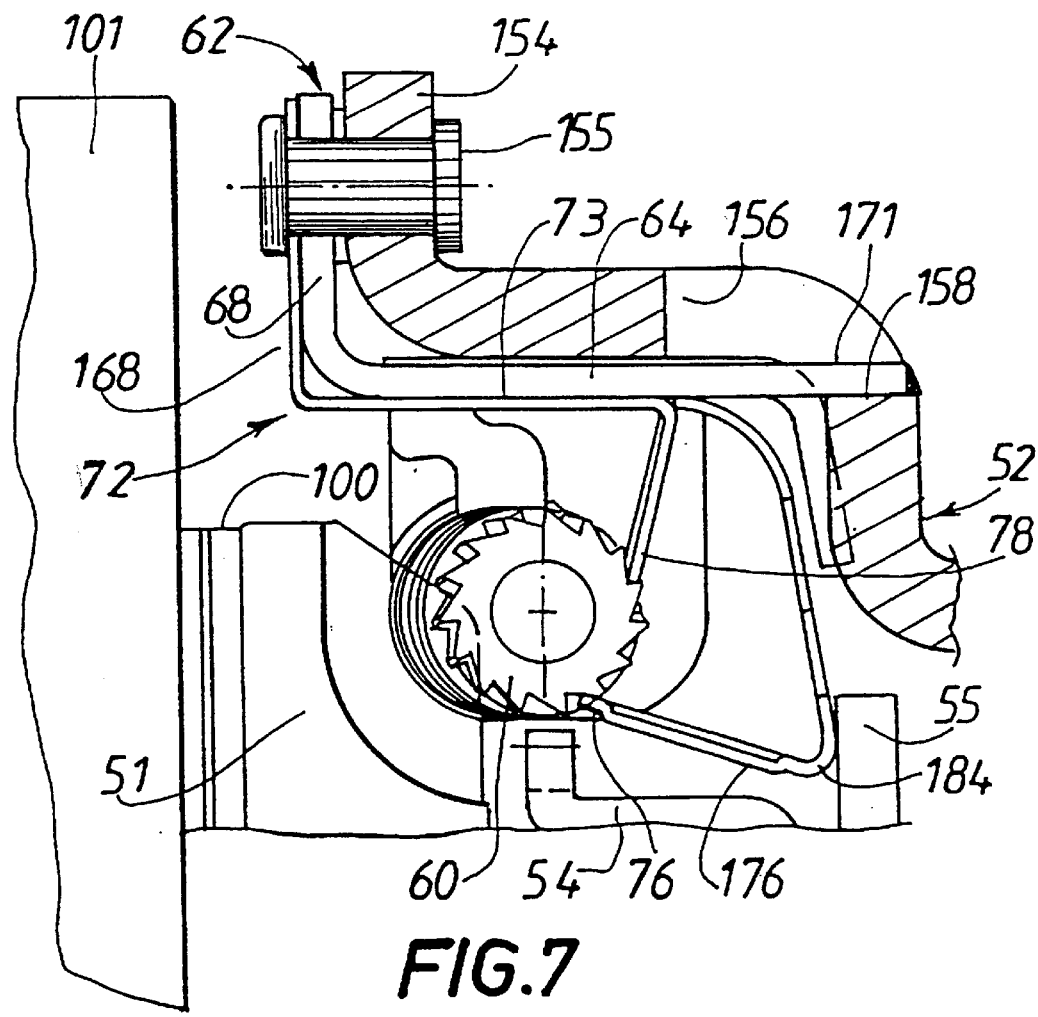
FIG. 7 is a view to a larger scale of the inset T in FIG. 2.
Figure 9:
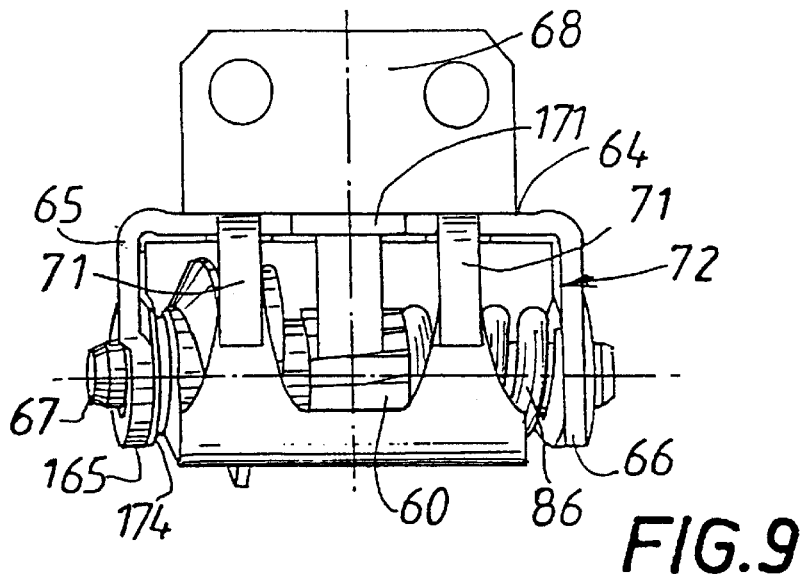
FIG. 9 is a view in perspective in the direction of the arrow 9 in FIG. 8.
Figure 12:
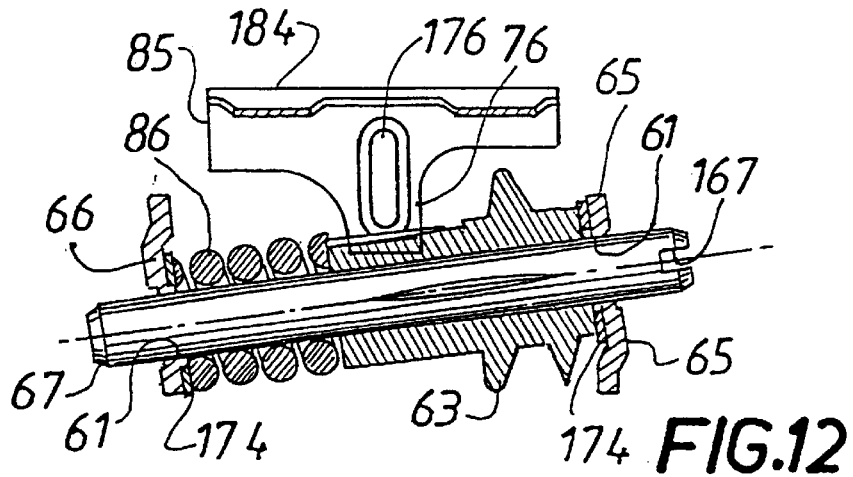
FIG. 12 is a view in section along the line 12—12 in FIG. 11.
Figure 8:
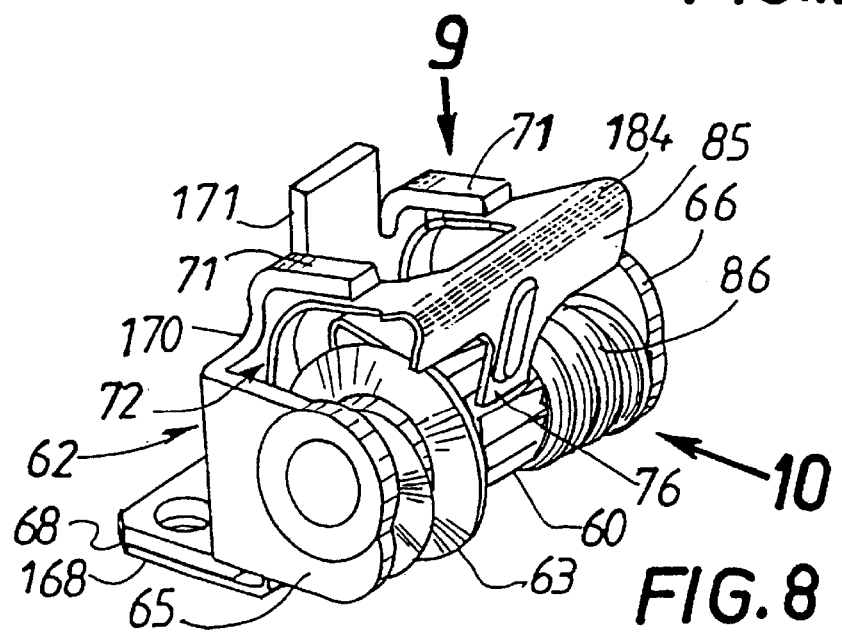
FIG. 8 is a view in perspective of the wear take-up unit.
Figure 10:
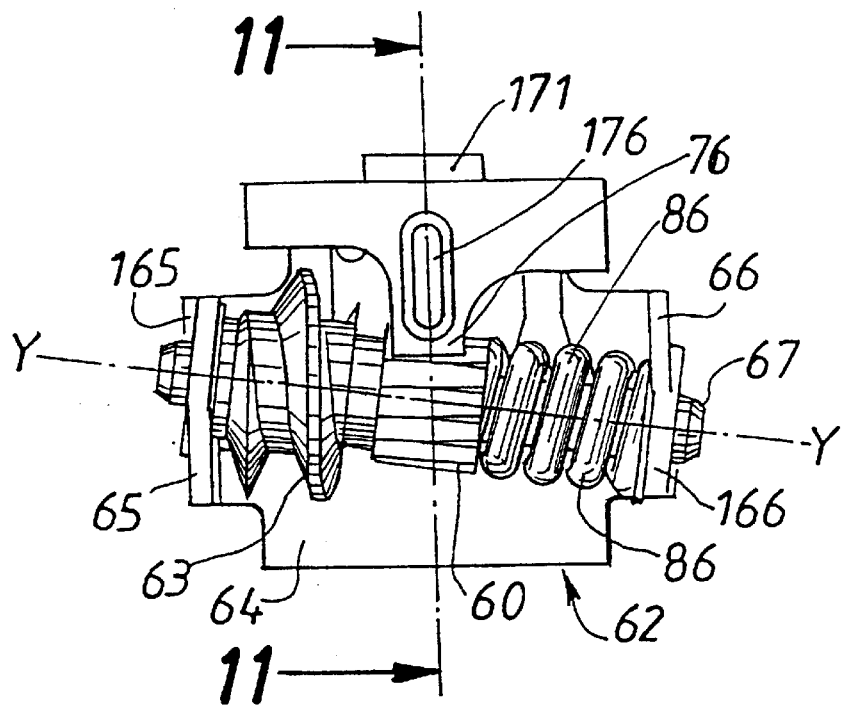
FIG. 10 is a view in the direction of the arrow 10 in FIG. 8.
Figure 13:
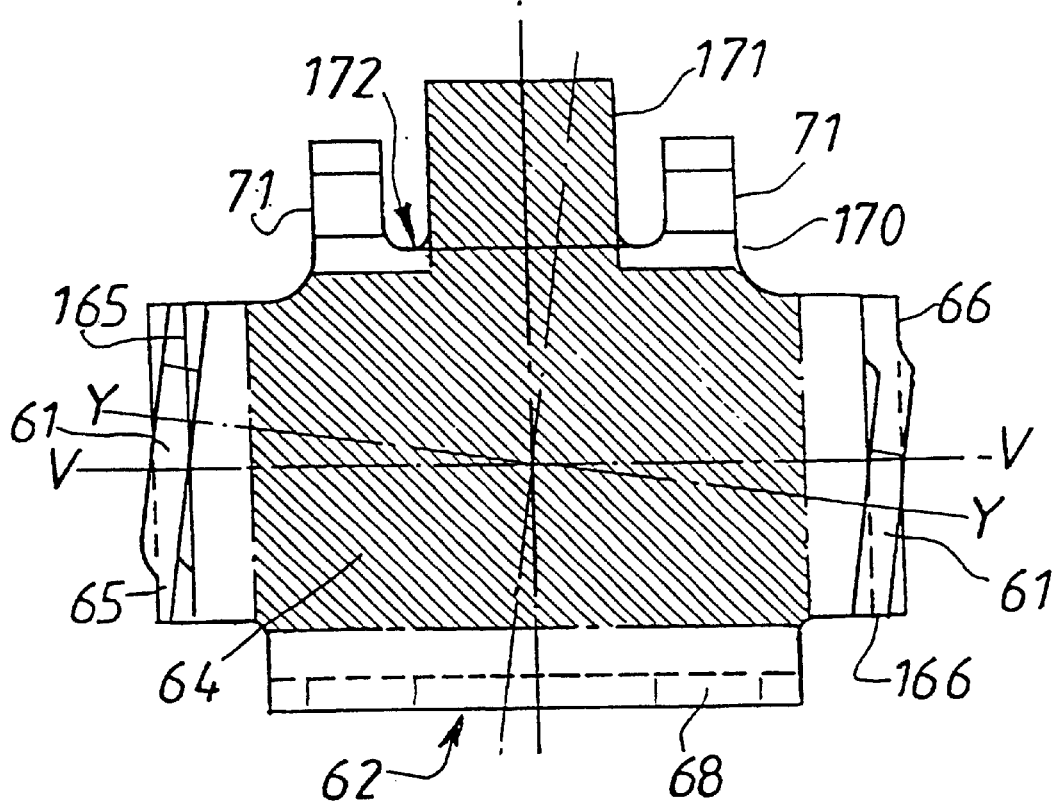
FIG. 13 is a view of the support for the unit in the direction of the arrow 10 in FIG. 8.

The shaft 67 of the ratchet wheel 60 is carried rotatably by a support 62, more clearly visible in FIGS. 8 and 13, made from cropped and bent sheet metal, in the shape of a U having a web 64 and two wings 65, 66 intended to support the shaft 67. To this end, each of the wings carries a circular hole 61 (FIG. 12) adapted to receive it; the web 64 carries laterally a square lug 68 directed radially towards the outside and intended to be fixed to an area 154 on the external flange 152 of the cover 52 by two rivets 155, the said area being offset axially towards the base of the cover 52. The cover 52 has an opening 156 (FIG. 7) for the web to pass and is simplified.

According to one characteristic, the axially oriented web 64 bears on the edge 158 of the opening 156 affecting the base of the cover 52. The web 64 can be fixed to the edge 158 belonging to the base of the cover 2, for example by bonding, welding or crimping.

In the case of fixing by crimping, the web 64 is shouldered and passes through a notch produced in the flange 158. After passing through the flange, the lateral ends of the web are crushed hot in order to effect the crimping.

More precisely, the web 64 of the support 62 has, on the side opposite to the one where the lug 68 is situated, an axial extension 170 intended to be fixed to the base of the cover 52. This extension is provided with returns 71 extending perpendicular to the web 64 and intended to constitute control stops whose role will become clear hereinafter; the ends of the said returns 71 are at a sufficient distance from each other to allow, without in terfering with it, movement of the actuator 55 during operations of engaging and disengaging.

The actuator 55 consists of a protuberance (or appendage) which the diaphragm 53 has radially projecting at its external periphery.

In practice the returns 71 extend radially above the actuator 55 and are inclined (FIGS. 7, 8, 9 and 13). These returns 71 issue, by cropping and bending, from the axial extension 170 of the web 64, whose flat area has been hatched in FIG. 13. The returns 71 are thus disposed on each side of an axial lug 171 and are separated therefrom by scallops with a semi-circular base 172.

This lug 171 extends in axial projection with respect to the returns and bears at its free end against the edge 158. This lug 171 is fixed at its free end to the edge 158 in the aforementioned manner, for example by welding, as can be seen in FIG. 7. The edge 158 forms an abutment surface for the lug 171.

The support 62 is thus simple in shape and is stable.

It is much simpler than the on e described in the aforementioned document FR 96 11297 since the returns 71 do not issue from the wings of the support. In addition the lug 171 makes it possible to decrease the number of fixing rivets and is a fixing and stabilisation lug.

By virtue of the invention the number of lugs for fixing to the cover is reduced.

Because of the opening 156 affecting the cover 52 at the level of the area of connection of the skirt of the cover to the base of the cover, it is easy to weld, bond or crimp the lug 171 to the edge 158 of the opening.

The support 62 is adapted to receive an elastic member 72.

Figure 15:
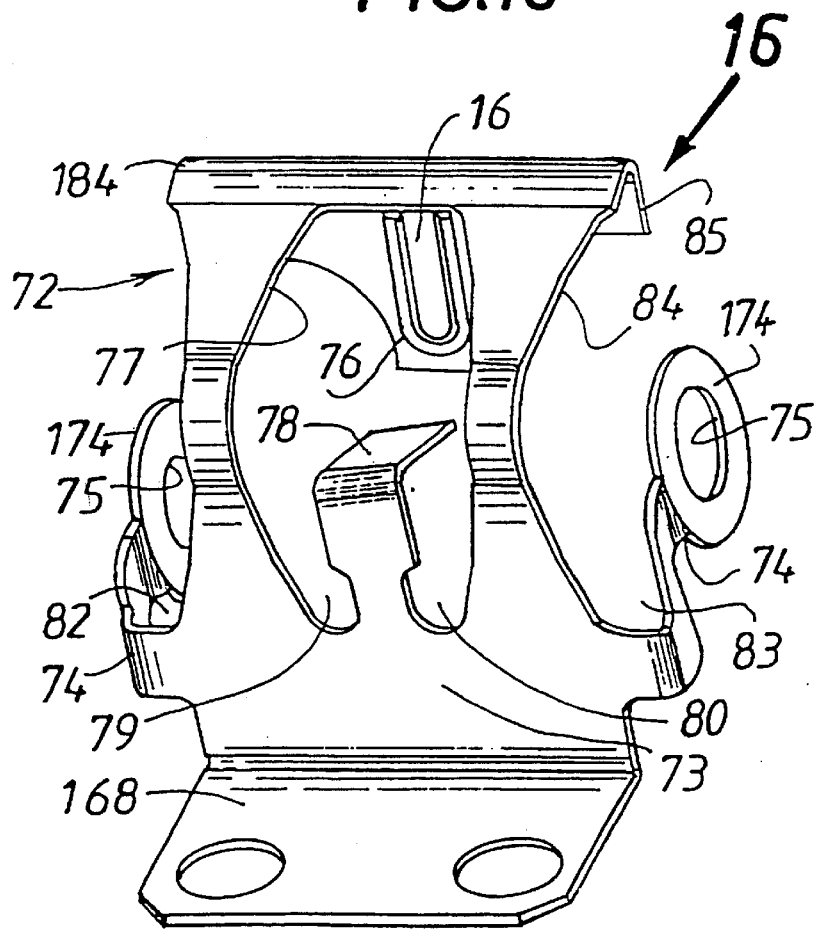
FIG. 15 is a view in perspective of the elastic member carried by the support.

Here the elastic member 72, more clearly visible in FIG. 15, is in the shape of a staple and comprises an elongate flat body 73 carrying at each of its ends an arm 74 provided with a hole 75 adapted to receive the shaft 67; the two arms 74 are parallel, as described below, and extend on the same side and roughly perpendicular with respect to the body 73.

On one of its longitudinal ends, the body 73 is extended in a slanting extension 84 on the same side as the one where the arms 74 are placed; scallops 82 and 83 provided in the body 73 limit the extension 84 with respect to the ends of the body 73 carrying the arms 74; in addition, these scallops 82 and 83 give the extension 84 a certain elasticity.

The free end of the extension 84 is provided with a return 85 which is extended in a control tongue 76 extending in the direction of the body 73 whilst being roughly parallel thereto.

A cut-out 77 is provided in the extension 84; by means of this cut-out 77 and scallops 79 and 80 in the body 73, a non-return catch 78 in the form of a blade is produced. The free end of the catch 78 extend s roughly perpendicular to the body 73.

Figure 11:
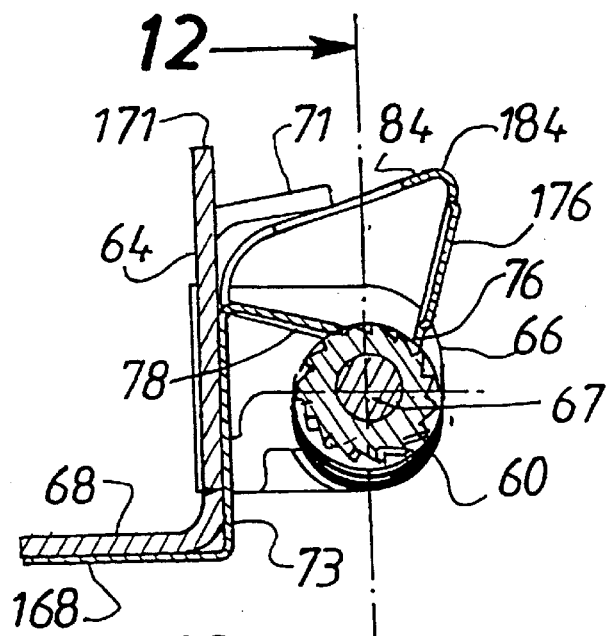
FIG. 11 is a view in section along the line 11—11 in FIG. 10.

Here, as can be seen more clearly in FIG. 11, the control tongue 76 and catch 78 are slightly inclined respectively with respect to the plane of the body 73 and the plane perpendicular to the plane of the body 73.

The catch 78 is offset with respect to the tongue 76, the free ends of the catch 78 and of the tongue 76 being offset circumferentially.

A helical compression spring 86 is placed between the ratchet wheel 60 and the free end of the arm 74, whilst being wound around the shaft 67; the worm 63 and ratchet wheel 60 are cut from the same piece.

The ratchet wheel 60 is located between the worm 63 and spring 86.

The helical spring 86 constitutes the elastic take-up means; the ratchet wheel 60 is in line with the non-return catch 78 which, by cooperation with the inclined teeth of the ratchet wheel 60, prevents the ratchet wheel 60, and the worm 63, from turning in the anticlockwise direction, as seen in FIG. 1.

The support 62 carrying the ratchet wheel 60, the worm 63 and the helical spring 86 being fixed to the cover 52, the diaphragm 53 moves with respect to it during the disengagement and re-engagement operations; the diaphragm 53 carries, at its periphery, a radial appendage (or radial protuberance), referred to as the actuator 55, extending radially outside the Belleville washer part of the diaphragm 53 in order to cooperate with the extension 84 of the elastic member 72, or more precisely with a rounded area 184 connecting the main part of the extension to the return 85 (FIG. 7); it will be understood that, by virtue of this arrangement, when the diaphragm 53 tilts during operations of disengagement and re-engagement, the actuator 53 moves the extension 84 from right to left, as seen in FIG. 1, and the control tongue 76, by cooperation with the teeth of the ratchet wheel 60, is caused to make the ratchet wheel 60 turn in the clockwise direction and therefore to make the screw 63 turn whilst compressing the spring 86; when the actuator 55, in return, is moved from left to right, the elasticity of the extension 84 of the elastic member 72 and the inclination of the teeth mean that the tongue 76 moves towards the right, climbing up the teeth which are held fixed with respect to rotation by the non-return catch 78.

The functioning of the clearance take-up device which has just been described is known and will be not be detailed; if necessary reference can be made to the French patent application 96 11 297 already cited, part of whose corresponding description should be considered to form part of the present application, knowing that, during the disengagement operation, the return travel or cocking travel of the control tongue 76 is limited by the extension 84, or more precisely the rounded area 186, coming into abutment against the returns 71 of the support 62, thicker than the member 72.

The role of the returns 71 (271 in the other figures) is to preserve the elastic member 72.

Here, the worm 63 and ratchet wheel 60 are in a single piece and are force-fitted on the shaft 67 carried by the support 62. The shaft 67 is fluted for its force-fitting in the piece 60, 63 and passes through the holes 61 in the wings 65 and 66 of the support 62. In this way an assembly—shaft 67, wheel 60 worm 63, spring 86—carried by the wings 66, 65 is formed. Here the shaft 67 is therefore fixed to the single-piece assembly consisting of worm 63 and ratchet wheel 60, which is immobilised axially by the two arms 74 and the two wings 65, 66 respectively of the elastic member 72 and support 62. To do this the arms 74 have a free end in the form of a washer 174 (FIG. 15) with a hole at 75.

One of the washers 174 is interposed axially between the internal face of the wing 65 and the free end of the worm 63, extending here over less than two turns, here 1/25 of a turn, whilst the other washer 174 is interposed between the internal face of the wing 66 and the free end of the helical spring 86.

In this way there is formed, in a unitary fashion, a manipulatable and transportable unit 10 having parts, here all metallic, namely the support 62, the elastic member 72, the helical spring 86, the ratchet wheel 60, the worm 63 and the shaft 67, the elastic member 72 (FIGS. 8 and 11) having, at its end opposite to the extension 83, a radially oriented lug 168 abutting the lug 68 of the support 62. The body 73 abuts the web 64. The lug 168 has, like the lug 68, two holes for the passage of fixing rivets 155.

It will be noted that the external periphery of the pressure plate is cut away locally for housing the unit 10 (FIG. 7) and reducing the axial bulk.

Naturally, a housing 110 is formed as a thicker part, here by deformation on a press, at the level of the area 154 of the flange 152 on the cover 52 for mounting the unit 10 (FIGS. 1 and 7).

The housing 110 is delimited by the area 154 fixed to a centrally oriented web (not referenced), whose end opposite to the area 154 is provided with the opening 156.

Here three housings 110 are provided, as can be seen in FIG. 1. Only one housing is used for mounting the unit 10.

Two inclined lateral portions 111 connect the web to holed areas of the flange 152 for passage of the members fixing the cover to the reaction plate.

The housing 110 protects the unit 10 and is open at the level of the area 154.

Cut-outs (not referenced) are produced in the portions 111 extending on each side of the central web of the housing 110. The ends of the shaft 67 project beyond the wings 65, 66. The shaft 67 has a slot 167 at its end projecting beyond the flange 65. In this way there are created means of re-setting the wear take-up device to zero.

For this re-setting to zero, a tool is provided, not visible.

This tool can be in the form of a screwdriver, whose blade enters the slot 167. As a variant the tool consists of a rod whose end carries a manoeuvring knob, for example knurled, and whose other end is flat for entering the slot 167.

The cut-outs produced in the portions 111 of the cover 52 define a passage in alignment with the shaft 67 for passage of the tool.

The operation of re-setting the wear take-up device to zero easily results from the above description.

For more information reference should be made to the document FR 97 06655 of May 30, 1997 showing a form of tool.

When the tool is in place, the fixing with respect to rotation of the worm 63 with respect to the tool makes it possible, by turning the tool, to turn the worm 63 with respect to the cover 52 and therefore the set of teeth 59 with respect to the pressure plate 51, and the ramps 56 with respect to the studs 57.

The circumferential length of the set of teeth 59 corresponds to the quantity of wear which it has been decided to take up, having regard obviously to the few teeth with which the worm 63 meshes in the initial state.

When the chosen quantity of wear corresponding to the circumferential length of the set of teeth 59 has been taken up, the worm 63 no longer cooperates with the set of teeth 59.

When the friction disc is changed, in order to reset the wear take-up device to zero, it suffices, with any tool, to cause the ramp means 54 to turn about their shaft so that the ramps 56 climb up the studs 57 until the first tooth on the set of teeth 59 encounters the first thread of the worm 63; by rotating the worm 63 by means of the zeroing tool, a few of the first teeth of the set of teeth 59 are brought into engagement with the threads on the worm 63.

The angle through which it is necessary to turn the ramp means 54 in the first phase of the zeroing depends on the number of wear take-up devices; usually there is only one wear take-up device so that the angle is large. In order to minimise this angle whatever the number of devices, it is possible to provide a set of teeth 59 composed of several teeth elements such as the elements 59A, 59B, 59C shown in FIG. 17: advantageously, as mentioned above, there are as many teeth elements as ramps 56, each element corresponding to the chosen wear on a friction disc; the ramps 56 are opposite the teeth elements 59A, 59B, 59C.

Naturally the elastic member 72, here metallic, has a lower thickness than that of the support 62 so as to make flexible the catch 78 and the control tongue 76, which has at its centre a protrusion 176, here oblong in shape. By virtue of this protrusion 176 all the mechanical stresses are taken to the centre of the tongue 76 so that the tongue 76 is less fragile. This arrangement increases the service life of the tongue 76, the protrusion 76 being a pressed part.

Figure 14:
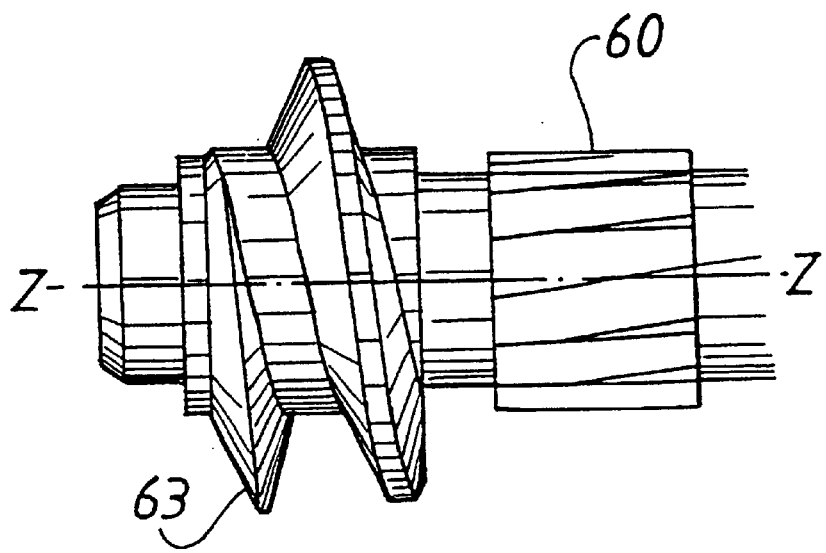
FIG. 14 is a view of the worm—ratchet wheel assembly.

As can be seen more clearly in FIG. 14, the teeth on the ratchet wheel 60 are inclined with respect to the axis Z—Z of axial symmetry of the assembly consisting of ratchet wheel 60 and worm 63. The teeth on the wheel 60 are in line with the catch 78, forming a non-return catch, and the control tongue 76.

According to one characteristic of the invention the shaft 67 and therefore the single-piece assembly consisting of worm 63 and wheel 60 is inclined.

In all the figures this inclination is produced by an axial offsetting of the centres of the holes 61 in the wings 66, 65 perpendicular to the web 64.

More precisely (FIGS. 1 to 17) the centre of the hole 61 in the wing 65 adjacent to the worm 63 is closer axially to the base of the cover 52 than is the centre of the hole 61 in the wing 66 adjacent to the spring 86. The inclination of the shaft 67 and therefore of the worm 63 is a function of the inclination of the thread and the pitch of the worm 63.

Here the system consisting of worm 63 and set of teeth 59 is irreversible, the worm 63 can drive the set of teeth 59 but not vice-versa.

Here the angle of inclination of the shaft 67 is roughly an angle equal to that of the thread of the worm.

By virtue of this arrangement the teeth in the set of teeth 59 are straight, which facilitates driving by meshing and prevents any jamming, the contact surface area between the thread of the worm 63 and the teeth of the set of teeth being at a maximum. The shaft 67 is therefore inclined with respect to a plane perpendicular to the axis of axial symmetry X—X of the clutch and of the clutch mechanism, the screw 63 extending tangentially with respect to the set of teeth 59.

By virtue of these provisions the system consisting of set of teeth 59 and worm 63 has good efficiency, the thread of the worm extending roughly parallel to the flanks of the teeth of the set of teeth.

The teeth on the ratchet wheel 60 are inclined as a function of the inclination of the shaft 67 corresponding to the angle which the lines V—V and Y—Y make between them in FIG. 13.

More precisely, a straight (parallel) contact is sought between on the one hand the teeth of the ratchet wheel 60 and on the other hand the non-return catch 78 and the control tongue 76. As a result, according to one characteristic of the invention, the free end of the catch 78 is inclined by an angle which is a function of the inclination of the shaft 67, itself dependent on the thread on the worm 63. This inclination can be seen for example in FIGS. 8, 15, 16.

This inclination depends on the circumferential offset between the free ends of the catch 78 and tongue 76 (FIGS. 7 and 11).

The areas of contact between the teeth on the wheel 60 on the free ends of catch 78 and of the tongue are at a maximum and linear.

The catch 78 and tongue 76 bear on the entire surface of the relevant tooth of the ratchet wheel.

More precisely, by virtue of the inclination of the teeth on the ratchet wheel, the free end of the control tongue 76 is parallel to the facing tooth on the ratchet wheel 60, and therefore the teeth on the said wheel.

On the other hand, because of the offset of the catch 78 with respect to the tongue 76, the free end of the catch 78 is then not parallel to the opposite teeth on the wheel 68 if precautions are not taken.

Figure 16:
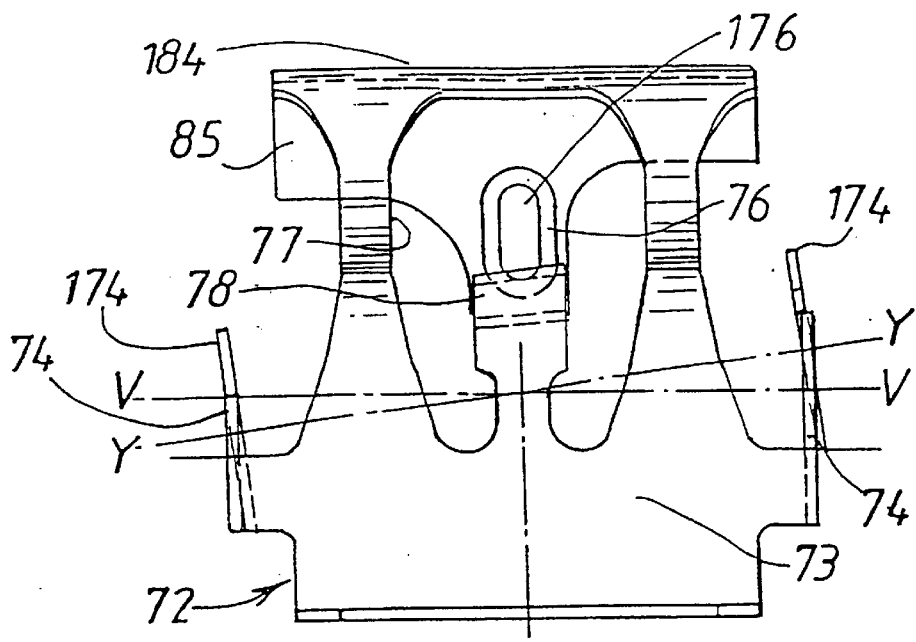
FIG. 16 is a view in the direction of the arrow 16 in FIG. 15.

Thus, as can be seen more clearly in FIGS. 15 and 16, the catch is twisted in order to take account of this offset. This twisting results in inclining the free end of the catch 78 with respect to the straight free end of the control tongue 76.

The catch 78 is therefore twisted in order to cooperate in a straight manner, that is to say in a manner parallel with the teeth on the ratchet wheel 60.

By virtue of these provisions the area of contact between the actuator 55 and the elastic member 72 is at a maximum, in the clutch engaged position the diaphragm being roughly in a plane perpendicular to the axis X—X of the clutch mechanism and the clutch.

The elastic member 72 is in linear contact through its rounded area 184 with the entire surface of the actuator 55 of the diaphragm, in all positions of the diaphragm.

When the clutch is re-engaged, good transmission of forces is obtained, by virtue notably of the dished part 176 forming a protrusion, with maximum contacts between on the one hand the actuator 55 and the elastic member 72 and on the other hand between the teeth on the wheel 60 and the control tongue 76. The wear take-up device therefore has further improved efficiency with even more minimised risks of jamming.

According to one characteristic the return 85 on the elastic member 72 has a non-symmetrical shape which takes account of the inclination of the shaft 67 of the pieces 63, 60, 86 located between the two wings 66, 65.

The return 85 carries the tongue 76 centrally in projection and has two portions on each side of the tongue.

The first portion, located opposite the worm 63, is less high than the second portion located opposite the take-up spring 86.

Thus the return 85 has a maximum mechanical strength in connection with the dished part 176 affording good transmission of forces since it is perpendicular to the rounded area 184. Naturally the free end of the tongue 76 and of the catch 78 is less wide than the teeth on the worm 60.

Here the wings 65 and 66 are twisted, as well as the arms 74, in order to incline the shaft 67 according to the thread on the tangential worm 63.

More precisely, the free ends of the wings 65 and 66 of the arms are inclined relative to a radial line symmetrically disposed there between situated in a plane perpendicular to a rotational axis of the clutch. The lateral wings 65 and 66 being perpendicular to the shaft 67 with symmetry line Y—Y inclined with respect to a second line V situated in a plane perpendicular to the axis X—X and to the web 64 (FIG. 13). The inclination of the lateral wings 65 and 67 thereby establishes inclination of the worm (63) and shaft (67) relative to the second line V situated in the plane and perpendicular to said radial line.

Thus the wings 65, 66 have a main part perpendicular to the web 64 and, at the level of the holes 61, inclined areas 165, 166 parallel to each other and perpendicular to the line Y—Y and to the shaft 67. The areas 165, 166 are inclined towards the inside of the web 65 and have the holes 61.

By virtue of this arrangement, the bulk is not overmuch increased.

Likewise the end washers 174 of the arms 74 of the member 72 are inclined and parallel to each other and to the areas 165, 166.

Thus the unit 10, notably the support 62 thereof, has a smaller bulk than if the entire unit had been inclined, whilst being simpler in shape.

Figure 18:
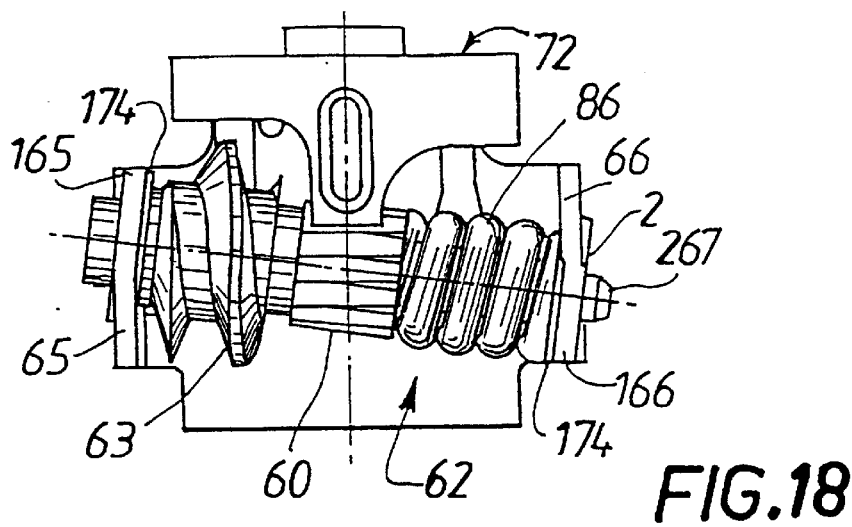
FIGS. 18 and 19 are views similar to FIGS. 10 and 12 for a second embodiment of the unit with inclined shaft.
Figure 19:
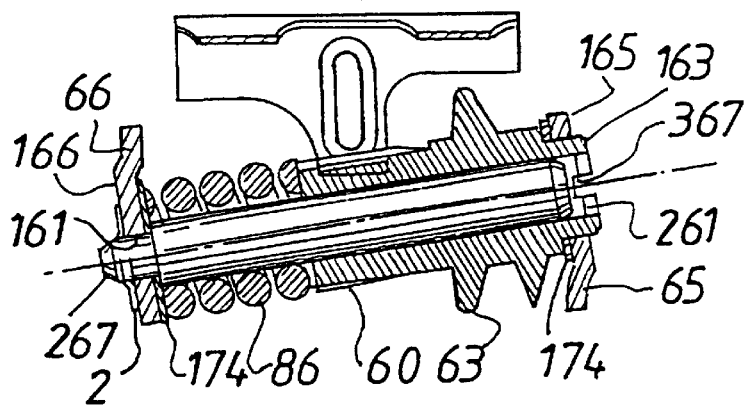

Naturally (FIGS. 18, 19), the shaft may not be secured to the worm 63 and wheel 60 assembly.

In this case, without modifying the wings 65, 66, it suffices to reduce the size of the holes in the inclined areas 165, 166 of the wings 65, 66.

Thus the shaft 67 has an end with a reduced diameter 267 passing through the washer 174 and a hole 161 in the inclined area 166 of the wing 66. The shaft enters the bore of the single-piece part 63, 60.

The worm 63 has a cylindrical extension 163, with a diameter greater than that of the shaft passing through the washer 174, and a hole 261 in the inclined area 165 of the wing 65. The hole 261 has a diameter greater than that of the hole 161 and the extension 163 has a slot 367 in order to be able to turn the worm 63 by means of a tool and to reset to zero as in FIGS. 1 to 17.

The shaft 67 is immobilised axially by virtue of the shoulder formed by its change in diameter and in contact with the face of the washer 174 turned towards the spring 86 and by virtue of an elastic washer 2 having arms in contact with the end 267, the said washer 2 being in contact with the external face of the area 166 of the wing 66.

The holes 161, 261 are offset axially with respect to each other. The piece 60–63 turns on the shaft also immobilised with respect to rotation by the washer 2.

In general terms the assembly consisting of the pieces 63, 60, 86, 87 is carried by the wings 66, 65 with holes in and the shaft 67 passes through at least the hole 61, 161 in one of the wings 66, 65.

In a variant (FIGS. 20, 21) the wings 65, 66 are not twisted, as well as the arms 74. The holes 361 formed in the wings 65, 66 are offset axially and have the same size for mounting a shouldered bearing 3 with a central hole.

The bearing 3, advantageously made of mouldable material or sintered material, with a low coefficient of friction, such as plastics material, has a change in diameter in order to form a shoulder for axially immobilising the relevant arm 74 between the said shoulder and the internal face of the relevant wing 65, 66.

The central hole in the bearing 3 is inclined according to the application. The shaft passes through the bearings 3.

Thus, by virtue of the inclined central holes in the bearings 3, the shaft 67 is inclined by the required value for maximum contact between the tangential worm 63 and the teeth in the set of teeth 64. As in all the figures, the thread on the worm 63 has a path (movement) parallel to that of the teeth of the set of teeth 59, the dorsal faces of the bearings are inclined so as to be parallel respectively to the end face of the worm 63 and to the end of the spring 86.

The shaft 67 has slots 167 for resetting to zero, the shaft 67 being force-fitted as in FIGS. 1 to 17 in the piece 60, 63.

Naturally, the shaft 67 can be of a single piece with the wheel 60 and worm 63. In this case (FIG. 22) it is necessary to open the passage holes produced in the wings 65, 66.

Thus the hole 461 can initially be a blind hole (FIG. 22) with a semicircular base. This hole 461 has a U-shape and is delimited by two tongues 462 which are then folded over in order to trap the bearing 3.

The bearing 3 is therefore fixed by crimping by virtue of the tongues 462, on its associated wing. This type of design applies also where the shaft is not inclined. This assists automatic mounting of all the pieces 3, 60, 63, 67, 86 on the wings. This mounting is simple and rapid.

Naturally, FIGS. 23 to 27, in a variant, the wings 66, 65 can carry the returns 71 and come into contact with the edge 158 of the opening 156 then higher radially, the diaphragm 53 being mounted for articulation on a dished part of the cover and on the heads of the small columns profiled accordingly. The returns 71 are directed towards each other and are inclined with respect to the wings 66, 65.

The solution is compact.

It is possible to weld the wings to the edge 158 forming a surface for the wings 66, 65.

In general terms the number of lugs for fixing to the cover is reduced still further.

Naturally the structures can be reversed, the shaft 67 or screw 63 has projections in order to be driven by a tool having slots for receiving the projections.

The means 152 of fixing the cover 52 to the reaction plate can consist of the skirt of the cover 52 fixed directly to the reaction plate, for example by crimping.

In general terms it is possible to form a module including the reaction plate, the friction disc whose friction linings are interposed axially between the reaction plate and the pressure plate of the friction clutch mechanism, whose cover is then fixed by its fixing means 152 detachably or non-detachably to the reaction plate.

It is for this reason that, in FIG. 1, holes can be seen in the fingers of the diaphragm. These holes allow the passage of at least one screwing tool in order to cooperate with the heads of the screws for fixing the reaction plate (possibly in two parts) to the crankshaft of the motor vehicle engine.

The reaction plate can then belong to a double damping flywheel having a first mass fixed to the crankshaft and carrying a bearing, such as a ball bearing, carrying the reaction plate with a hole or holes for passage of the screwing tool or tools as described in the document FR-A-2 716 511 with radial springs coupling the first mass to the reaction plate.

Naturally the axially acting engagement means can have another form and include two Belleville washers mounted in series with disengagement means in the form of levers as described in the document FR 96 11058 filed on Sep. 5, 1997. The screw 63 and wheel 60 can be two parts fixed to each other with respect to rotation.

The axis 76 is engaged inside a central hole in the worm 63 or in a single piece with the worm 63. In general terms the shaft 67 extends the worm 63. The abutment areas 14 can be connected to each other.

In all cases abutment means 14 are provided which, as a variant, can be distinct from the ramps 56 whilst being connected thereto as described in the document FR-A-2 684 151.

The presence of the arms 74 of the elastic member 72 is not essential, as the elastic member can be fixed for example by welding points to the web 64.

Figure 28:
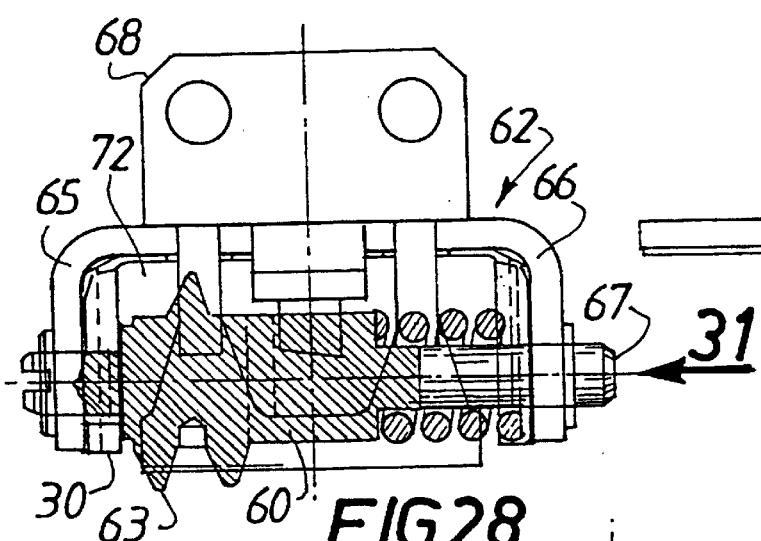
FIGS. 28 to 30 are views similar respectively to FIGS. 9, 10 and 7 for a fifth example embodiment.
Figure 29:
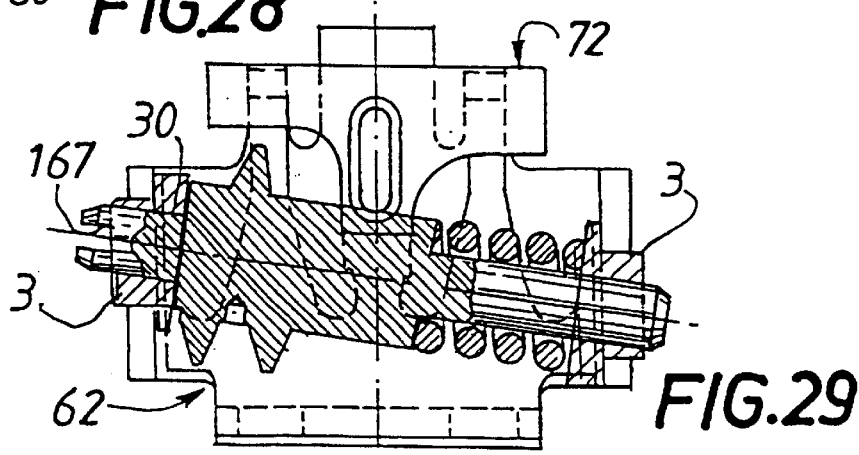
Figure 30:
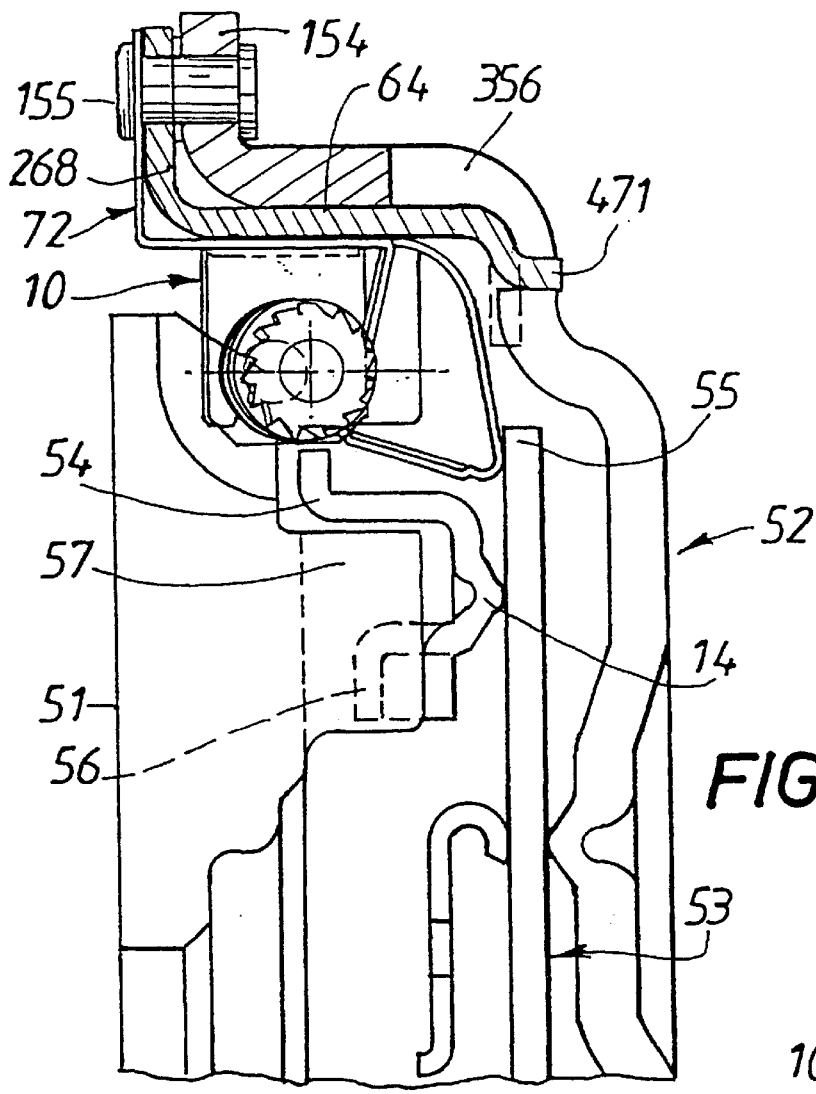

Thus, in FIGS. 28 to 30, the elastic member 72 bears directly on the bearings 3 or more precisely on the largest part 30 of the bearing 3, whose dorsal face is inclined, as can be seen in FIG. 29.

The member 72 bears elastically on the top of the parts 30.

Figure 21:
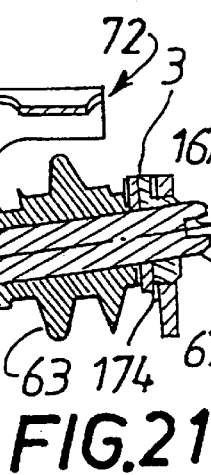
FIGS. 20 and 21 are views similar to FIGS. 10 and 12 for a third embodiment of the unit with inclined axis.
Figure 20:
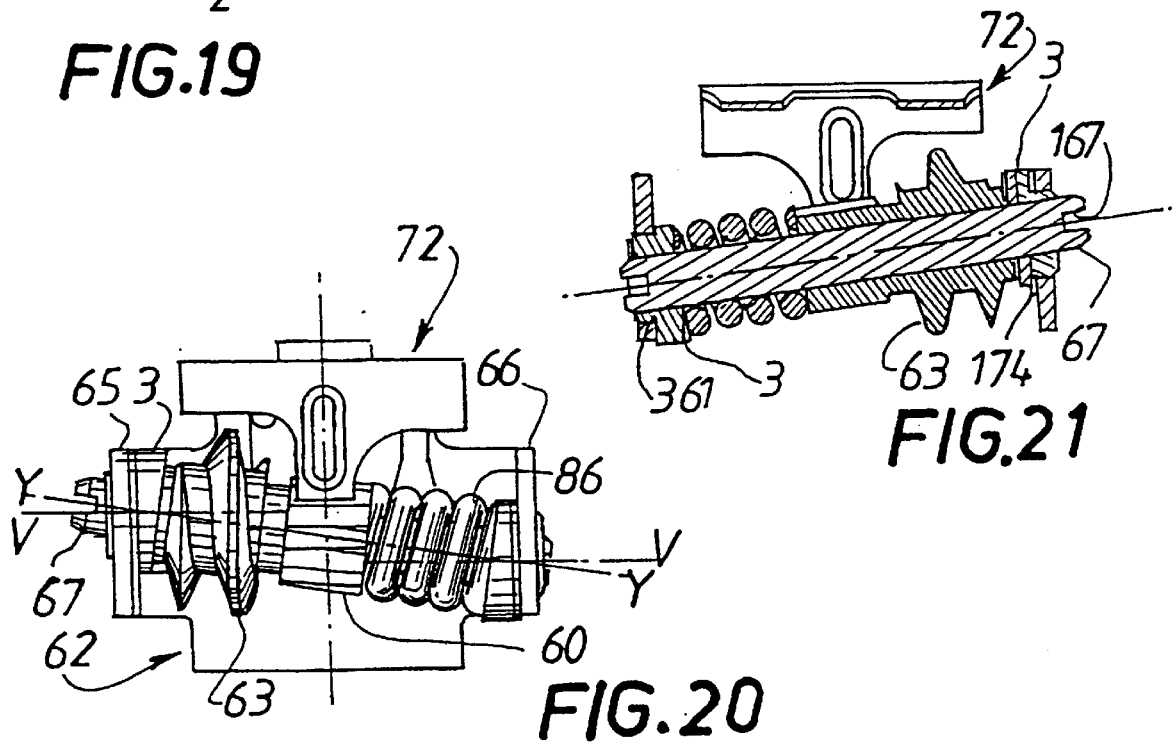

The part 30 is therefore of variable width, as in FIGS. 20 and 21, in which the largest part is not referenced.

The assembly consisting of worm 63, ratchet wheel 60 and shaft 67 is in a single piece and is mounted with the spring 86 and the two bearings between the non-twisted wings 65, 66.

The two parts 30 of the bearings are in contact with the internal faces respectively of the wings 66, 65.

Figure 22:
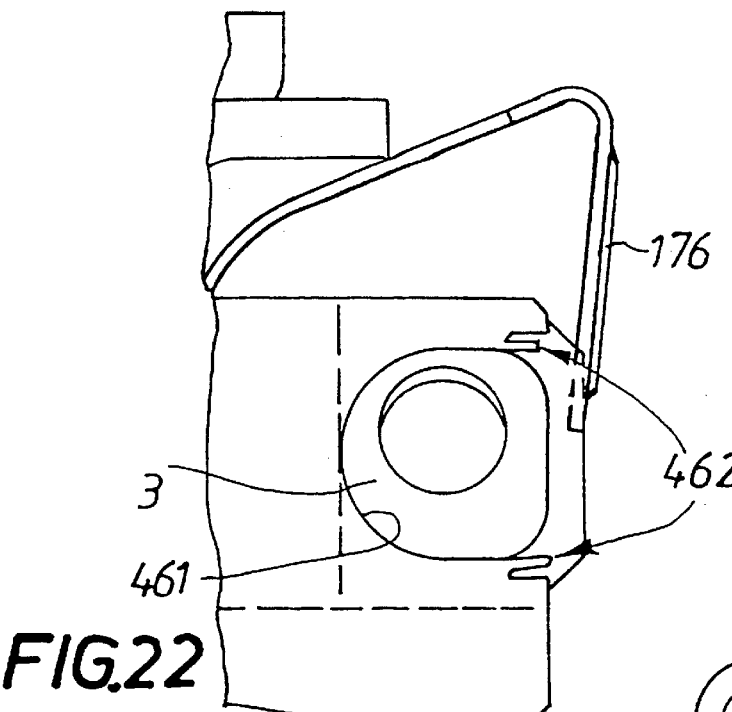
FIG. 22 is a partial view showing, in the context of the third embodiment, the hole in a support wing of the unit receiving its bearing before the latter is fixed.
Figure 31:
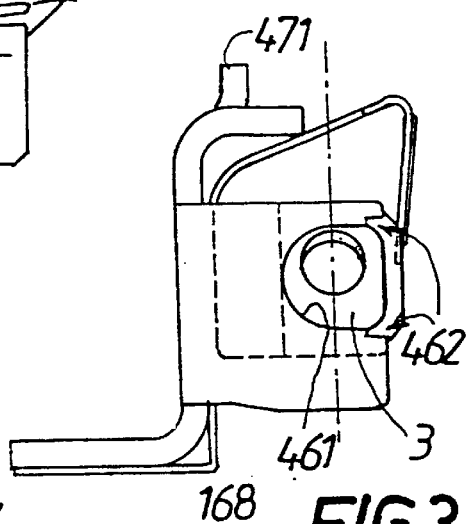
FIG. 31 is a view in the direction of the arrow 31 in FIG. 28.

The parts 31 of reduced diameter of the bearing 3, made of mouldable plastics material or sintered material, are slipped into the blind holes 461 of the type in FIG. 22, and then the tongues 462 are folded over in order to axially lock the bearings 3 by crimping.

It should be noted that the free end 471 of the fixing and stabilising lug is offset radially towards the shaft with respect to the web 64.

Thus the opening 356 is higher than that of FIG. 7, which makes it possible to produce it easily by press, the material of the opening being easily discharged.

The same applies to FIG. 23.

The axial end 471 therefore bears on the edge of the surface 158 of the opening 356 and is fixed thereto.

Figure 32:
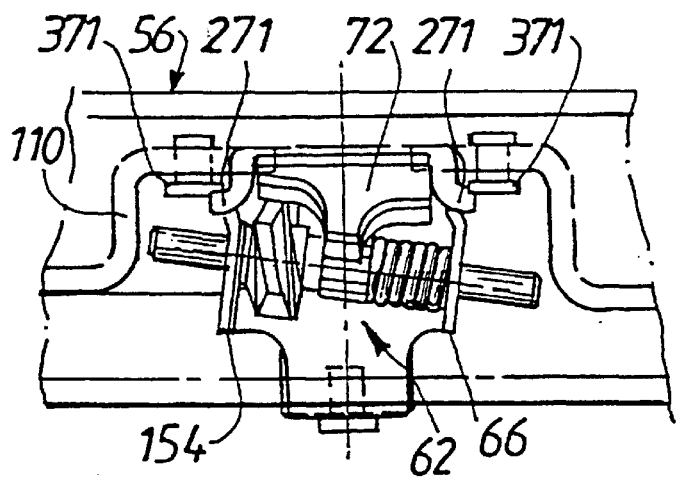
FIGS. 32 and 33 are views similar to FIGS. 6 and 9 for a sixth example embodiment, part of the ramp means being depicted in FIG. 32.
Figure 33:
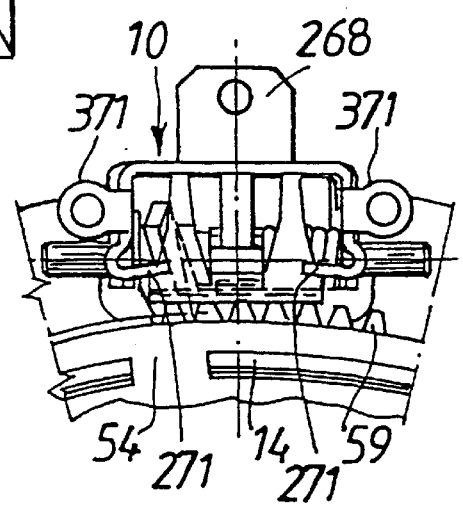

Naturally, FIGS. 32 and 33, rear fixing lugs 371 can issue from the wings 65, 66 as in the document FR 96 11297. The lugs 371 extend perpendicularly to the wings 66, 65 outside the support 62. The front fixing lug 268 is less wide than the front fixing lug in the previous figures and has only one hole.

The cover 52 is fixed by means of three fixing lugs 271, 268 and three rivets.

The returns 271 are identical to those of FIGS. 23 to 27, these returns, formed by bending of the wings 66, 65, are inclined.

The wings 66, 65 are twisted over a greater length, the wing 65 being twisted outwards.

In all cases the returns 71, 271 are control stops preserving the elastic member 72.

In all cases the contact faces (the free ends) of the twisted catch 78 and of the tongue 76 work in parallel with the teeth on the wheel 60.

The same applies to the worm 63 and set of teeth 59.

The pressure plate also advantageously has a recess on its dorsal face in order to prevent any interference with the unit.

By virtue of the invention, in the case of wear, precise functioning in at least three phases is obtained.

In a first phase, when the clutch is re-engaged, the tongue causes the wheel 60 to turn and the catch jumps a tooth. During the disengagement operation following this first phase, nothing happens. A second re-engagement phase starts, during which the tongue 76 causes the wheel 60 to turn, which then moves axially since the set of teeth 59 cannot turn because of the load exerted by the diaphragm.

The spring 86 is compressed. During the following disengagement operation a third phase starts in which the spring can expand and cause the set of teeth to turn if there is not too much friction to overcome. Otherwise it is necessary to recommence the operation.

In the preceding figures the support 62 is distinct from the cover 52.

As a variant, the support can be in a single piece with the cover 52. To do this, use can be made directly of the housing 110 since the latter has a cross section roughly in a U-shape with an axially orientated central web, forming the top wall of the housing 110, and two lateral wings 111.

It therefore suffices to produce three axially offset holes in the wings in order, according to the invention, to incline the worm and shaft.

Figure 34:
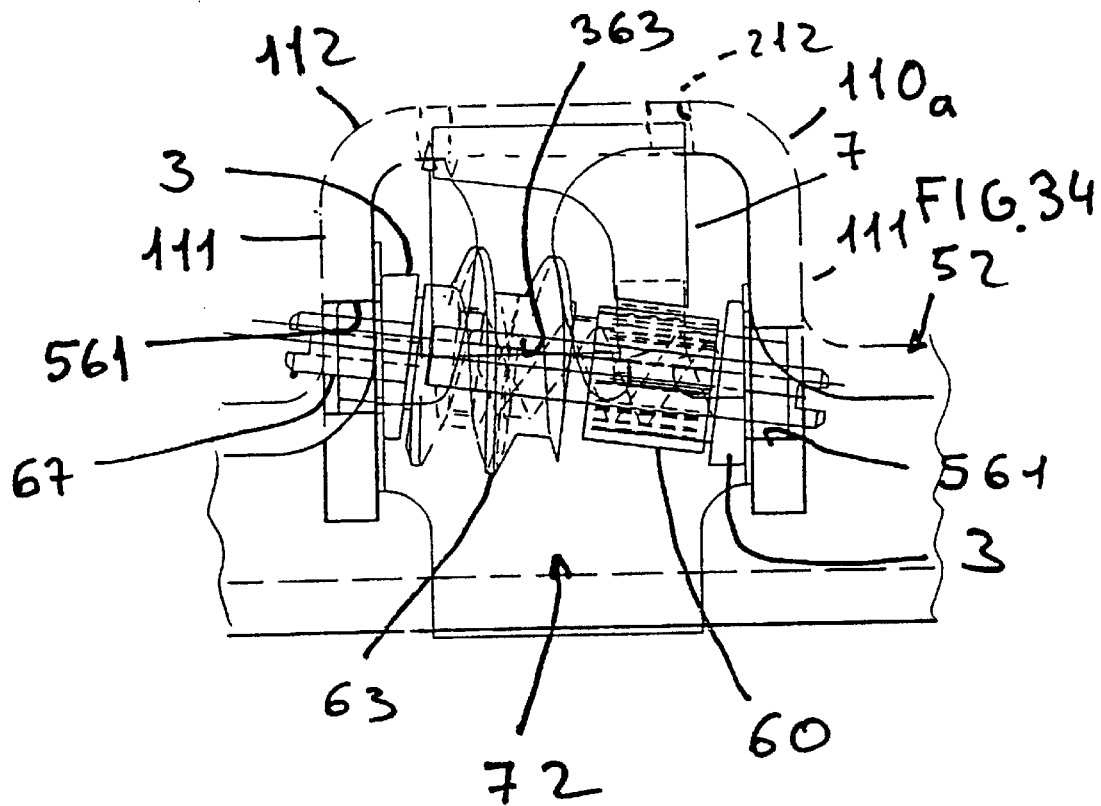
FIG. 34 is a view similar to FIG. 6 for a seventh example embodiment.
Figure 35:
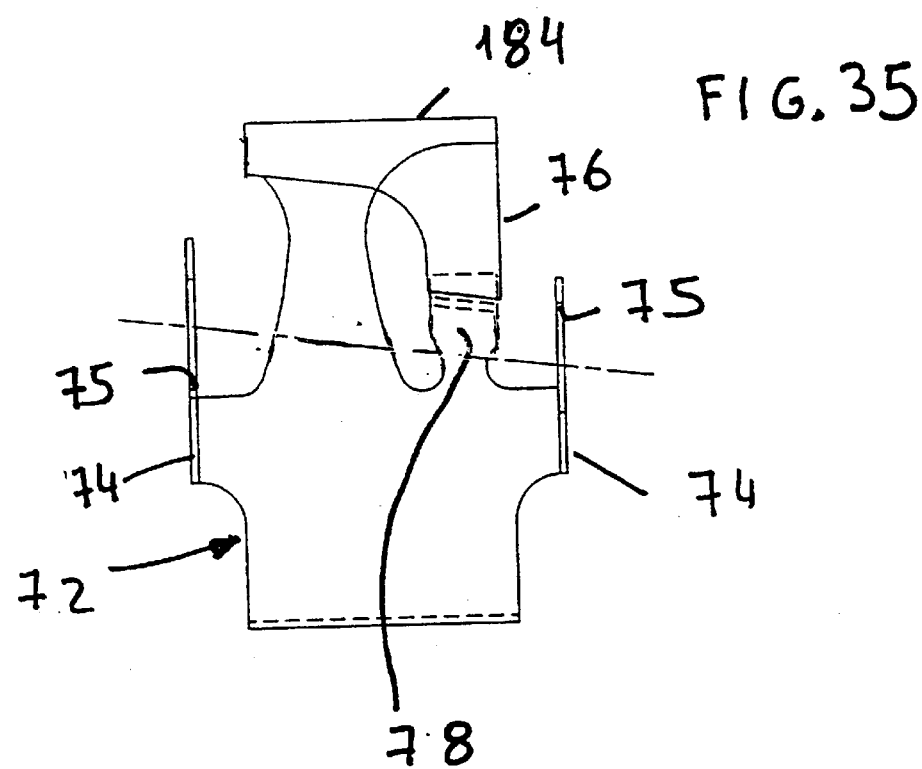
FIG. 35 is a view of the elastic member alone in FIG. 34.

Naturally, the take-up spring 86 may not belong to the unit 10. This spring can act between the ramps and counter-ramps of the wear take-up device. Thus, in FIGS. 34 and 35, the support is produced by means of the housing 110a of the cover 52 formed as a thicker part in the cover 52 like the housing 110 in the previous figures. The housing 110a therefore has, in cross section, roughly a U-shape with an axially oriented web 112 forming the top wall of the housing 110a affecting the skirt of the cover 52 and two lateral wings 111 in each of which a blind hole 561 is formed for mounting a bearing 3 identical to that of FIGS. 28 to 31, so that the bearing 3 is easily fixed by crimping, bonding or welding to the wings 111.

There is formed a unit 10 comprising the elastic member 72 between the wings 74, between which there are interposed the bearings 3 and an assembly consisting of ratchet wheel 60 and worm interposed between the two bearings. The unit is slipped by means of its bearings 3 into the blind holes 561 and then immobilised by locking its bearings 3 on the wings 111. The unit 10 has a shaft 67 passing, as in the previous figures, through the bearings 3, the wings 74 and member 72 finally being trapped between the wings 111 of the housing and the bearings 3 with an inclined central bore. The housing 110a is less wide because of the absence of the take-up spring in the unit. As a result the catch 78 and control tongue 76 extend on one side of the return 184 in order to be able to cooperate with the ratchet wheel 60 through which a first shaft passes centrally, a first end of which is engaged in a blind hole 363 in the worm 63 and the second end of which passes through the wing 74, the bearing 3 and the relevant hole 561. This first shaft is force-fitted in the hole 363 and the wheel 60 in order to secure it to the worm 63 and to the ratchet wheel 60.

In a variant, the shaft is fixed by bonding or any other means to the worm 63 and to the wheel 60. The worm 63 is extended, here in a single piece, by a second shaft passing through the other wing 74, the other bearing 3 and the other hole 561 so that the shaft 67 is in two parts, which makes it possible to form the aforementioned unit 10. The control stops are produced by means of a scallop 212 in the web 112, preferably T-shaped in order to form two end shoulders constituting the control stops. The shaft 67 has slots at its ends for resetting to zero as mentioned above.

Figure 36:
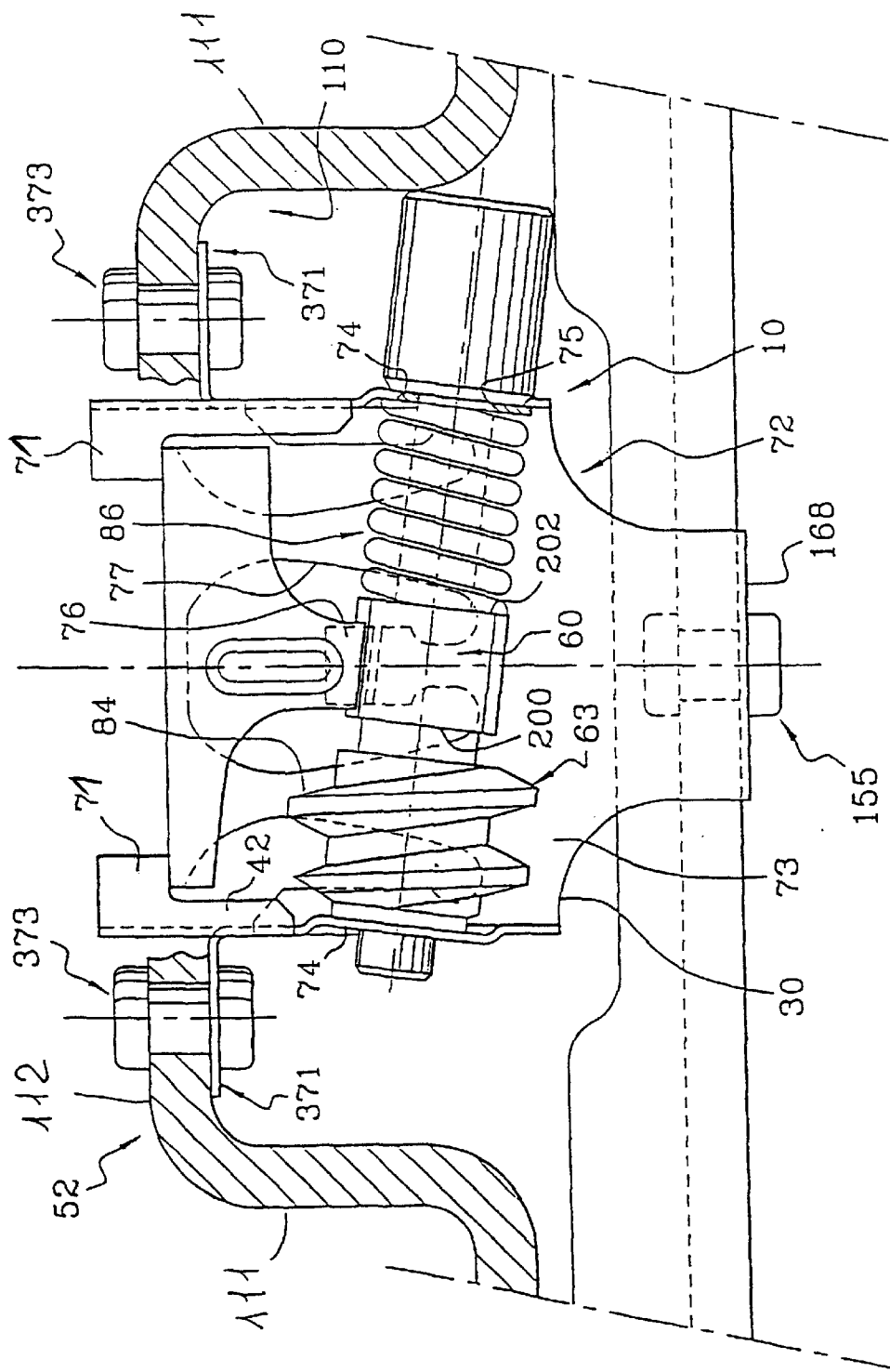
FIG. 36 is a view similar to FIG. 32 for an eighth example embodiment.
Figure 37:
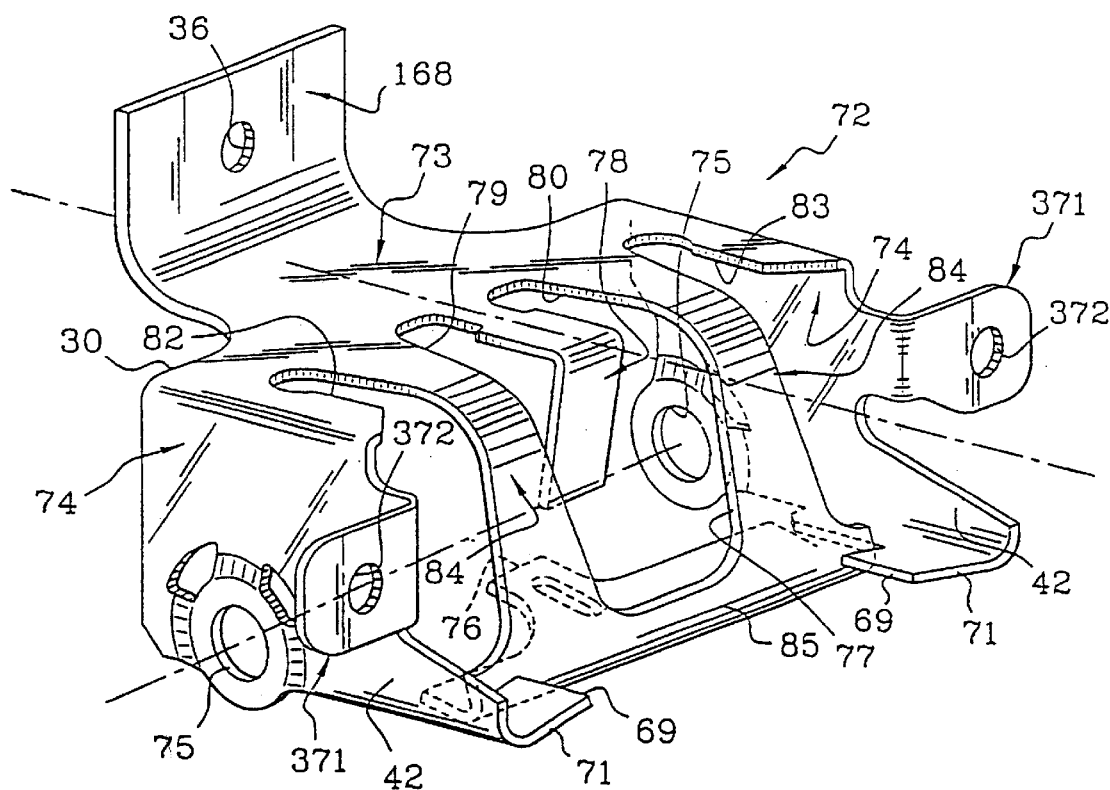
FIG. 37 is a perspective view of the elastic member of FIG. 36.

The elastic member 72, having roughly a U-shape with a central web 73 and two wings 74, can constitute by itself the support for the unit thus simplified as shown in FIGS. 36 and 37.

This unit will therefore have a reduced number of components, is lighter and therefore easier to balance. In these figures, the same reference signs are used for the elements common to the other figures. The elastic member 72 is a piece of sheet metal cropped and bent as in the other figures. The web 73 is extended towards the rear and then obliquely radially towards the inside by an oblique extension 84 delimited by scallops 82, 83 so that the extension is elastic and is cut centrally by a cut-out 77, which divides the extension into two arms. The free end of the extension forms a return 85 in the form of a tangentially oriented bar extended by the control tongue 76.

The catch 78 is produced by means of the cut-out 77 and scallops 79, 80 formed in the web 73. As a result, the catch 76 and tongue 78 are inclined with respect to the plane of the web 73 and the catch 70 is offset with respect to the tongue 78. The ratchet wheel 60 has a lateral face 200 adjacent to the worm 63 and a lateral face 202 on which there acts the helical take-up spring in contact with the twisted wing 74 at the level of the passage hole 75 for the shaft. The other wing 74 is also twisted at the level of the other hole 75 for passage of the other end of the shaft 67.

The holes 75 are offset axially for inclination of the shaft 67 immobilised axially at one of its ends by cooperation of a larger-diameter portion with the relevant wing 111 of the housing 110 and at the other end by a circlip. The shaft passes through the single-piece assembly consisting of worm 63 and wheel 60 and is fixed to this assembly, by force-fitting or bonding etc.

Two rear lateral fixing lugs 371 extend transversely towards the outside from the rear vertical edge of the wings 74. Each lug has a hole 372 for passage of the rivet 373 for fixing to the central web 112 of the housing 110. One fixing lug 168 extends at right angles from the front edge 30 of the web 73 and is intended to be fixed by a rivet 155, passing through a hole 36 in the lug 166, to an area of the flange 152 on the cover. The wings 74 extend beyond the rear edges by means of a horizontal arm 42 itself extended by a return 71 directed transversely towards the inside and constituting a control stop for the tongue, the ends 69 of the return 71 being directed towards each other.

Figure 39:
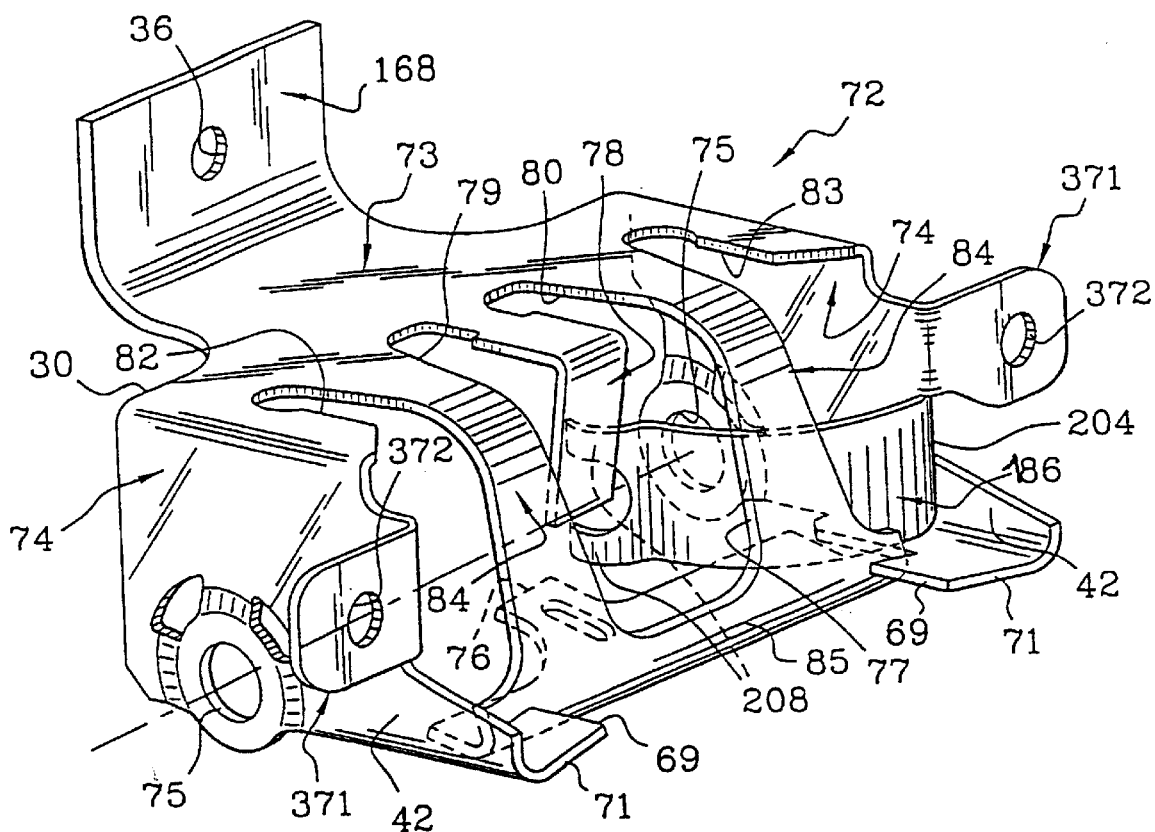
FIG. 39 is a view similar to FIG. 38 for a tenth example embodiment.

In a variant (FIG. 39), the elastic take-up means consist of an elastic blade 183 produced in one piece with the member 72. The blade 186 has an anchoring part 204 which connects it to the rear edge of a wing 74. This blade 186 extends in an inclined fashion towards the inside of the unit and has a curved free end 208 with two spaced-apart branches for passage of the shaft of the assembly 60, 63. The end 208 cooperates with the relevant lateral face of the ratchet wheel.

Figure 38:
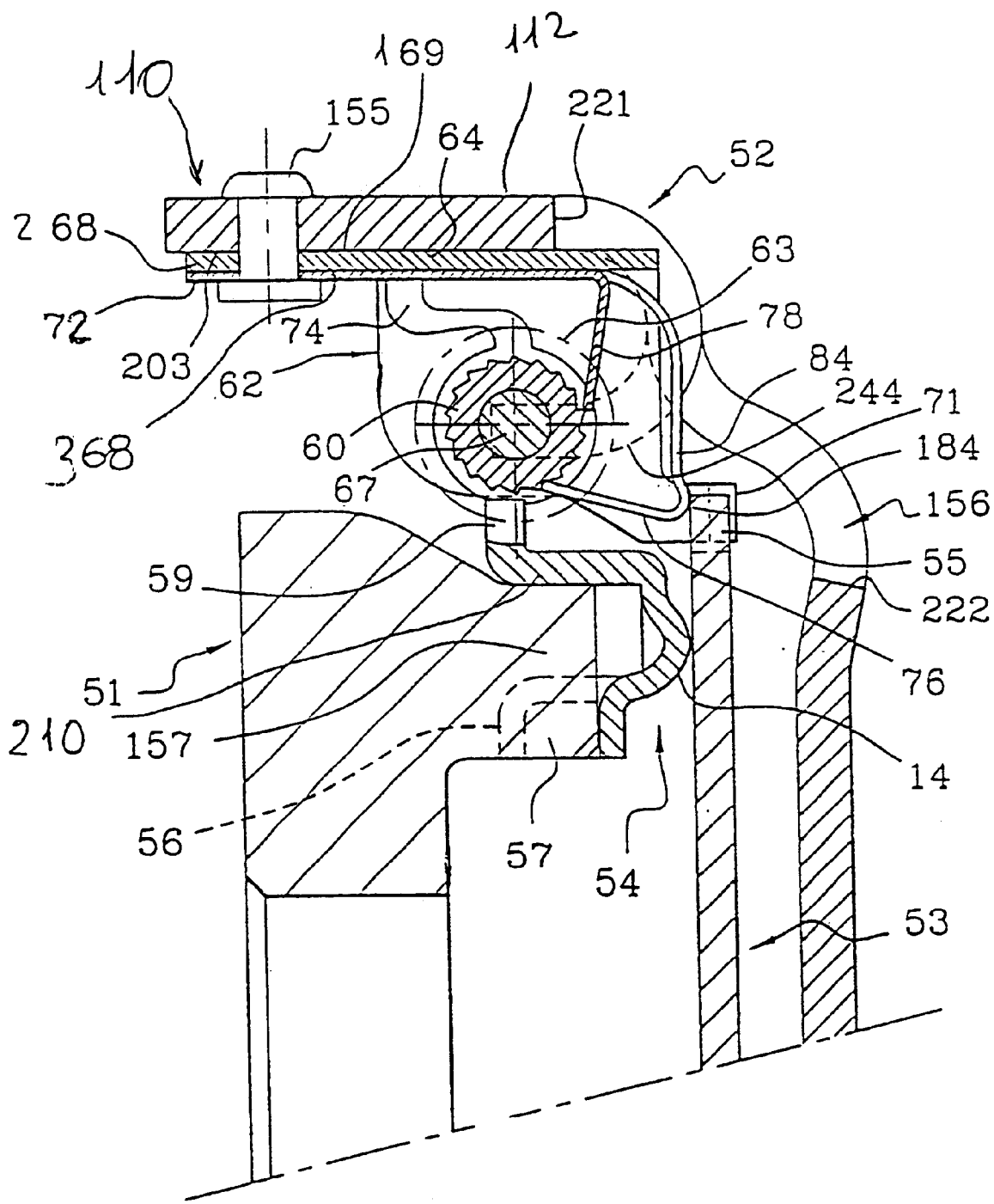
FIG. 38 is a view similar to FIG. 7, for a ninth example embodiment.

Naturally, FIG. 38, the support can be fixed horizontally to the web 112 of the housing 110, the top face 169 of the web 164 being in contact with the bottom face 203 of the web 112. The rivets 155 serve for fixing lugs 268, 368 of the pieces 62, 72 to the web 112.

The window 156 is delimited by top 221 and bottom 222 edges, whilst the appendage 55 acts on a rounded part of the return 84. The flange 210 for centring the wing 54 on the thicker part bears the reference 210.

It will be noted in FIG. 2 that the base of the cover is extended radially inwards in order to form, at its internal periphery, a stop 301 offset axially with respect to the primary abutment of the cover, and this in the opposite direction to the pressure plate in order to enable the diaphragm to abut before mounting of the engagement mechanism on the reaction plate of the engine flywheel in order to protect the unit 10 to prevent the latter from being damaged.

What is claimed is:

1. A Friction clutch mechanism having a cover (52), a pressure plate (51) connected with respect to rotation to the cover (52) whilst being able to move axially with respect thereto, abutment means (14) carried by the pressure plate (51), axially acting in engaging means (53) acting between the cover (52) and the abutment means (14), a wear take-up device comprising on one hand ramp means (54) fixed with respect to rotation to a set of external teeth (59) and placed between the pressure plate (51) and the abutment means (14) carrying the ramp means (54) and on another hand a unit (10) carried by the cover (52) and comprising a worm (63) cooperating with the set of external teeth (59), in which the unit (10) has a support (62, 110, 72) roughly in a U-shape with a web (64, 112, 73) and two lateral wings (65, 66) each provided with a hole (61, 161, 261, 361, 461, 561, 75) for rotatably mounting an assembly comprising the worm (63) on which there is mounted a shaft (67) passing through at least one hole (61, 161, 261, 361, 461, 561) in one of the lateral wings, wherein said lateral wings are inclined relative to a radial line symmetrically disposed there between situated in a plane perpendicular to a rotational axis of the clutch thereby establishing inclination of the worm (63) and shaft (67) relative to a second line (v) situated in said plane and perpendicular to said radial line.

2. Mechanism according to claim 1, wherein the shaft (67) and worm (63) are inclined at an angle equal to that of the thread of the worm (63).

3. Mechanism according to claim 1, wherein the wings (66, 65) are twisted.

4. Mechanism according to claim 3, wherein the free ends of the wings (65 and 66) are inclined so that the wings have inclined areas (165, 66) parallel to each other and perpendicular to the shaft (67), the said inclined areas being provided with holes (61, 161 . . . ).

5. Mechanism according to claim 4, wherein the shaft has an end with a reduced diameter (267) passing through a hole (161) in the inclined area (166) of one of the flanges (66) and in that the worm (63) has a cylindrical extension (163) passing through the hole (265) passing through the inclined area (165) of the other wing (65).

6. Mechanism according to claim 1, wherein bearings (3) with central holes are mounted in the holes (361) in the wings (65, 66) and in that the central holes in the bearings are inclined for inclination of the worm (63) and shaft (67).

7. Mechanism according to claim 6, wherein the bearings (3) are shouldered and have inclined dorsal faces.

8. Mechanism according to claim 3, wherein one of the elements, shaft (67)-worm (63), is shaped so as to be driven in rotation by a tool for resetting to zero.

9. Mechanism according to claim 1, wherein the support (62, 110) carries an elastic member (72) provided with a control tongue (76) carried by a return (85) on the said elastic member and a non-return catch (78), in that the non-return catch (78) and control tongue (76) are able to cooperate with a ratchet wheel (60) secured to the worm (63) and in that the return (85) on the elastic member has two portions of different heights disposed on each side of the control tongue (76).

10. Mechanism according to claim 9, wherein a first of the portions is disposed opposite the worm (63) at a height less than the second portion disposed opposite a helical compression spring, the worm (63) and helical spring being disposed on each side of the ratchet wheel (60) whilst being interposed between the two wings (65, 66).

11. Mechanism according to claim 9, wherein the teeth on the ratchet wheel (60) are inclined in accordance with the worm (63) and in that the non-return catch (78) is twisted in order to cooperate in a straight fashion with the inclined teeth on the ratchet wheel (60).

12. Mechanism according to claim 11, wherein the return (85) on the elastic member is connected to a rounded area (184) in contact with an appendage (55) of the axially acting engaging means (51) of the clutch.

13. Mechanism according to claim 9, wherein the control tongue (56) has a protrusion (176) at its centre.

14. Mechanism according to claim 9, wherein the support (62) is distinct from the cover (52) and in that the web (64) of the support (62) is extended axially in order to have a lug (171) entering an opening (158) in the cover (52).

15. Mechanism according to claim 14, wherein said lug (171) is fixed to one of the edges (158) of the opening (56), by one of welding, bonding and crimping.

16. Mechanism according to claim 15, wherein two returns (71) are disposed on each side of the lug (171) in order to limit the movement of an elastic member (72) carried by the support (62).

17. Mechanism according to claim 1, wherein the lateral wings (65, 66) are engaged in an opening (156) formed in the cover (52).

18. Mechanism according to claim 17, wherein the lateral wings (65, 66) are fixed to one of the edges (158) of the opening (156).

19. Mechanism according to claim 6, wherein the bearings (3) are engaged in blind holes (461) produced in the wings (66, 65) and locked by crimping (462) in the said holes.

20. Mechanism according to claim 9, wherein the support (110) is in a single piece with the cover (52).

21. Mechanism according to claim 9, wherein elastic member is in a single piece with the support.

* * * * *